US011816193B2

(12) United States Patent
Hamzeh et al.

(10) Patent No.: US 11,816,193 B2
(45) Date of Patent: Nov. 14, 2023

(54) SECURE AUTOMATED ISSUE DETECTION

(71) Applicant: Cisco Technology, Inc., San Jose, CA (US)

(72) Inventors: Mohammed Hamzeh, Woluwe-Saint-Lambert (BE); David C. White, Jr., St. Petersburg, FL (US); Nitesh Arora, Ottawa (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 278 days.

(21) Appl. No.: 16/853,040

(22) Filed: Apr. 20, 2020

(65) Prior Publication Data
US 2021/0326412 A1 Oct. 21, 2021

(51) Int. Cl.
*G06F 21/12* (2013.01)
*G06N 20/00* (2019.01)
(Continued)

(52) U.S. Cl.
CPC ............ *G06F 21/125* (2013.01); *G06F 21/14* (2013.01); *G06F 21/54* (2013.01); *G06N 20/00* (2019.01);
(Continued)

(58) Field of Classification Search
CPC ........ G06F 21/125; G06F 21/14; G06F 21/54; G06F 21/552; G06F 21/6254;
(Continued)

(56) References Cited

U.S. PATENT DOCUMENTS

| 6,917,929 B2 * | 7/2005 | Teloh | H04L 41/0856 |
| 7,376,969 B1 * | 5/2008 | Njemanze | H04L 63/1425 709/224 |

(Continued)

FOREIGN PATENT DOCUMENTS

| CN | 107409126 B | * | 3/2021 | ......... G06F 21/6218 |
| CN | 111479265 B | * | 6/2021 | ........... H04L 9/0643 |

(Continued)

OTHER PUBLICATIONS

Flowprint: Semi-Supervised Mobile-App Fingerprinting on Encrypted Network Traffic by Thijs van Ede, Riccardo Bortolameotti, Andrea Continella, Jingjing Ren, Daniel J. Dubois, Martina Lindorfer, David Choffnes, Maarten van Steen, and Andreas Peter pp. 18; Dated: Feb. 23-26, 2020.*

(Continued)

*Primary Examiner* — Shahriar Zarrineh
*Assistant Examiner* — Ali H. Cheema
(74) *Attorney, Agent, or Firm* — Edell, Shapiro & Finnan, LLC

(57) ABSTRACT

In one example, a server obtains a plurality of code modules configured to identify issues in one or more network devices of a target network. Based on the plurality of code modules, the server generates a fingerprinting process configured to produce a fingerprint that includes a plurality of key-value pairs. Each key of the plurality of key-value pairs is a unique key that corresponds to select data associated with raw data obtained from the one or more network devices. Each value of the plurality of key-value pairs represents information regarding the select data. Based further on the plurality of code modules, the server generates an analysis model that is uniquely compatible with the fingerprinting process. The analysis model is configured to identify the issues in the one or more network devices based on the key-value pairs.

18 Claims, 18 Drawing Sheets

(51) Int. Cl.
*G06F 21/14* (2013.01)
*G06F 21/54* (2013.01)
*H04L 9/40* (2022.01)
*H04W 12/02* (2009.01)
*G06F 21/55* (2013.01)
*G06F 21/62* (2013.01)

(52) U.S. Cl.
CPC .......... *G06F 21/55* (2013.01); *G06F 21/6254* (2013.01); *H04L 63/0421* (2013.01); *H04W 12/02* (2013.01)

(58) Field of Classification Search
CPC .. G06F 21/62; G06F 21/56–564; G06F 21/12; G06F 21/55; G06F 21/554; G06F 21/44; G06N 20/00; H04L 63/0421; H04L 29/06; H04W 12/02; H04W 12/12
USPC .......................................................... 713/190
See application file for complete search history.

(56) References Cited

U.S. PATENT DOCUMENTS

| | | | | |
|---|---|---|---|---|
| 8,024,488 | B2* | 9/2011 | Salowey | H04L 9/32 710/10 |
| 9,842,017 | B1 | 12/2017 | Zhang et al. | |
| 9,860,257 | B1* | 1/2018 | Kumar | G06F 11/3006 |
| 10,432,687 | B1* | 10/2019 | Hanes | H04L 65/80 |
| 10,673,880 | B1* | 6/2020 | Pratt | H04L 63/1433 |
| 11,227,047 | B1* | 1/2022 | Vashisht | G06F 21/56 |
| 2004/0236189 | A1* | 11/2004 | Hawthorne | G16H 40/40 600/300 |
| 2004/0268148 | A1* | 12/2004 | Karjala | H04L 63/166 713/150 |
| 2009/0089869 | A1* | 4/2009 | Varghese | G06Q 20/4014 726/7 |
| 2011/0252476 | A1 | 10/2011 | Loveland et al. | |
| 2012/0026890 | A1* | 2/2012 | Banka | H04L 67/125 370/242 |
| 2012/0026898 | A1* | 2/2012 | Sen | H04W 4/38 370/252 |
| 2012/0026938 | A1* | 2/2012 | Pandey | H04L 43/065 370/328 |
| 2014/0280314 | A1* | 9/2014 | Coleman | G06F 16/21 707/769 |
| 2016/0154867 | A1* | 6/2016 | Chen | G06F 9/4881 707/756 |
| 2016/0277435 | A1* | 9/2016 | Salajegheh | H04W 12/12 |
| 2017/0116413 | A1* | 4/2017 | Takacs | G06F 21/554 |
| 2017/0139887 | A1* | 5/2017 | Miller | G06F 3/04842 |
| 2017/0279838 | A1* | 9/2017 | Dasgupta | H04L 63/1425 |
| 2018/0103374 | A1* | 4/2018 | Huang | H04L 63/0876 |
| 2018/0115578 | A1* | 4/2018 | Subbarayan | H04L 63/04 |
| 2018/0122506 | A1* | 5/2018 | Grantcharov | G16H 40/67 |
| 2019/0158524 | A1* | 5/2019 | Zadeh | H04L 43/045 |
| 2019/0297063 | A1* | 9/2019 | De Gaspari | H04L 9/0847 |
| 2019/0349263 | A1* | 11/2019 | Ghosh | H04L 41/0873 |
| 2020/0090027 | A1* | 3/2020 | Oliner | G06F 40/274 |
| 2020/0134230 | A1* | 4/2020 | Booth, Jr. | H04L 63/0428 |
| 2021/0037032 | A1* | 2/2021 | Soeder | H04L 63/20 |

FOREIGN PATENT DOCUMENTS

| | | | | |
|---|---|---|---|---|
| JP | 2014528678 | A * | 10/2014 | H04L 12/66 |
| KR | 100352849 | B1 * | 9/2002 | |
| WO | WO-2017209845 | A1 * | 12/2017 | G06F 21/552 |
| WO | WO-2018019298 | A1 * | 2/2018 | G06F 21/44 |

OTHER PUBLICATIONS

Clock Around the Clock: Time-Based Device Fingerprinting by Iskander Sanchez-Rola, Igor Santos and Davide Balzarotti pp. 13; Dated: Oct. 15-19, 2018.*
50 Ways to Leak Your Data: An Exploration of Apps' Circumvention of the Android Permissions System by Joel Reardon; Álvaro Feal; Primal Wijesekera; Amit Elazari; Narseo Vallina-Rodriguez and Serge Egelman pp. 19; Dated: Aug. 14-16, 2019.*
Hwankuk Kim, Taeun Kim and Daeil Jang, (An Intelligent Improvement of Internet-Wide Scan Engine for Fast Discovery of Vulnerable IoT Devices), Published: May 10, 2018.*
Shachar Siboni, Vinay Sachidananda, Yair Meidan, Michael Bohadana, Yael Mathov , Suhas Bhairav, Asaf Shabtai, and Yuval Elovici, (Security Testbed for Internet-of-Things Devices), IEEE, vol. 68, No. 1, Mar. 2019.*
Eunhye Ko, Taeeun Kim, and Hwankuk Kim, (Management platform of threats information in IoT environment), Published online: Sep. 23, 2017.*
Farhan Ullah, Hamad Naeem, Sohail Jabbar, Shehzad Khalid, Muhammad Ahsan Latif, Fadi Al-Turjman, and Leonardo Mostarda, (Cyber Security Threats Detection in Internet of Things Using Deep Learning Approach), Sep. 13, 2019.*
International Search Report and Written Opinion in counterpart International Application No. PCT/US2021/027039, dated Jul. 9, 2021, 14 pages.
Vikash Singh, "Regex was taking 5 days to run. So I built a tool that did it in 15 minutes.", Nov. 8, 2017, 12 pages. retrieved from Internet Apr. 17, 2020; https://www.freecodecamp.org/news/regex-was-taking-5-days-flashtext-does-it-in-15-minutes-55f04411025f/.
Zhao Lucis Li et al., "Accelerating Rule-matching Systems with Learned Rankers", 2019 USENIX Annual Technical conference, USENIX Association, Jul. 10-12, 2019, Renton, WA, 8 pages.
Thomas M. Kelly et al., "Managing Intellectual Capital—via E-Learning—at Cisco", Chapter 56, Internet Learning Solutions Group, Cisco Systems, San Jose, CA, 22 pages, 2003.
Rajat Mishra, "Cisco's Journey to Predictive Services: Three Lessons from Hollywood", Cisco Blogs, Oct. 19, 2017, 9 pages.
Cisco,"Connected TAC: Customer Data Security", Cisco, 2017, 8 pages.
Cisco, "Cisco Connected TAC", Cisco, Mar. 2017, 1 page.

* cited by examiner

900

```
BDC-MDS9513-1# show version
Cisco Nexus Operating System (NX-OS) Software
TAC support: http://www.cisco.com/en/US/products/ps9372/tsd_products_support_series_home.html
Copyright (c) 2002-2016, Cisco Systems, Inc. All rights reserved.
The copyrights to certain works contained herein are owned by
other third parties and are used and distributed under license.
Some parts of this software are covered under the GNU Public
License. A copy of the license is available at
http://www.gnu.org/licenses/gpl.html.

Software
  BIOS:      version 1.0.10
  loader:    version N/A
  kickstart: version 6.2(17)
  system:    version 6.2(17)
  BIOS compile time:     01/08/09
  kickstart image file is:  bootflash:///m9500-sf2ek9-kickstart-mz.6.2.17.bin
  kickstart compile time: 6/17/2016 23:00:00 [07/09/2016 18:21:26]
  system image file is:   bootflash:///m9500-sf2ek9-mz.6.2.17.bin
  system compile time:    6/17/2016 23:00:00 [07/09/2016 19:31:21]

Hardware
  cisco MDS 9513 (13 slot) Chassis ("Supervisor/Fabric-2a")
  Motorola, 7447A, altivec with 2071288 kB of memory.
  Processor Board ID JAF1447DCSR Device name: BDC-MDS9513-1
  bootflash:  1023128 kB
  slot0:   0 kB (expansion flash)

Kernel uptime is 146 day(s), 5 hour(s), 43 minute(s), 21 second(s)

Last reset at 413614 usecs after Wed Oct 2 10:18:28 2019

Reason: Reset triggered due to Switchover Request by User
  System version: 5.2(8e)
  Service: SAP(93): Swover due to install plugin
  Core Plugin
```

[{"creation":"2020_01_06_18_39_31","fingerprint":{"fe001e54074 7a6498ba909eb8cea4999a6":0, "fe0ca25a15fd6d4241989c2471245446 4a":0,"fe011e6273bce84a969391c954e9601653":0, 1020 — creation 1050 — fingerprint

...

"feff23584a1b14443 6a61c250a0dcfd348":0,"feff59cf293918 4f65bce0a6dcea15ed f5":0,"feff712 4bc105148bf9c79a14dcb345218":1},"gateway":"ASA","id":"test1 - 2020_01_06_18_39_31"}]

1030 — gateway/id
1040 — id

FIG.10

SECURE AUTOMATED ISSUE DETECTION

TECHNICAL FIELD

The present disclosure relates to computer networking.

BACKGROUND

Code modules may be used for automated issue detection of network devices in a customer network. The code modules may be in the form of software program scripts. The scripts are typically run in parallel, with each script analyzing raw data for a different problem. In one example, the scripts are coded to look for issues with software configuration or hardware settings of one of more of the network devices that generated the raw data. Code modules may also look for issues in operational data (e.g., security flaws) associated with the network devices. The scripts output any issues found in the data set. Any of the scripts may return a null set of results, indicating that the issue targeted by the script was not a problem in the raw data.

BRIEF DESCRIPTION OF THE DRAWINGS

FIG. 9 illustrates a display of raw data parsed by a fingerprinting process, according to an example embodiment.

FIG. 10 illustrates a display of a fingerprint generated by a fingerprinting process, according to an example embodiment.

DESCRIPTION OF EXAMPLE EMBODIMENTS

Overview

In one example embodiment, a server obtains a plurality of code modules configured to identify issues in one or more network devices of a target network. Based on the plurality of code modules, the server generates a fingerprinting process configured to produce a fingerprint that includes a plurality of key-value pairs. Each key of the plurality of key-value pairs is a unique key that corresponds to select data associated with raw data obtained from the one or more network devices. Each value of the plurality of key-value pairs represents information regarding the select data. Based further on the plurality of code modules, the server generates an analysis model that is uniquely compatible with the fingerprinting process. The analysis model is configured to identify the issues in the one or more network devices based on the key-value pairs.

Example Embodiments

Figure 1:
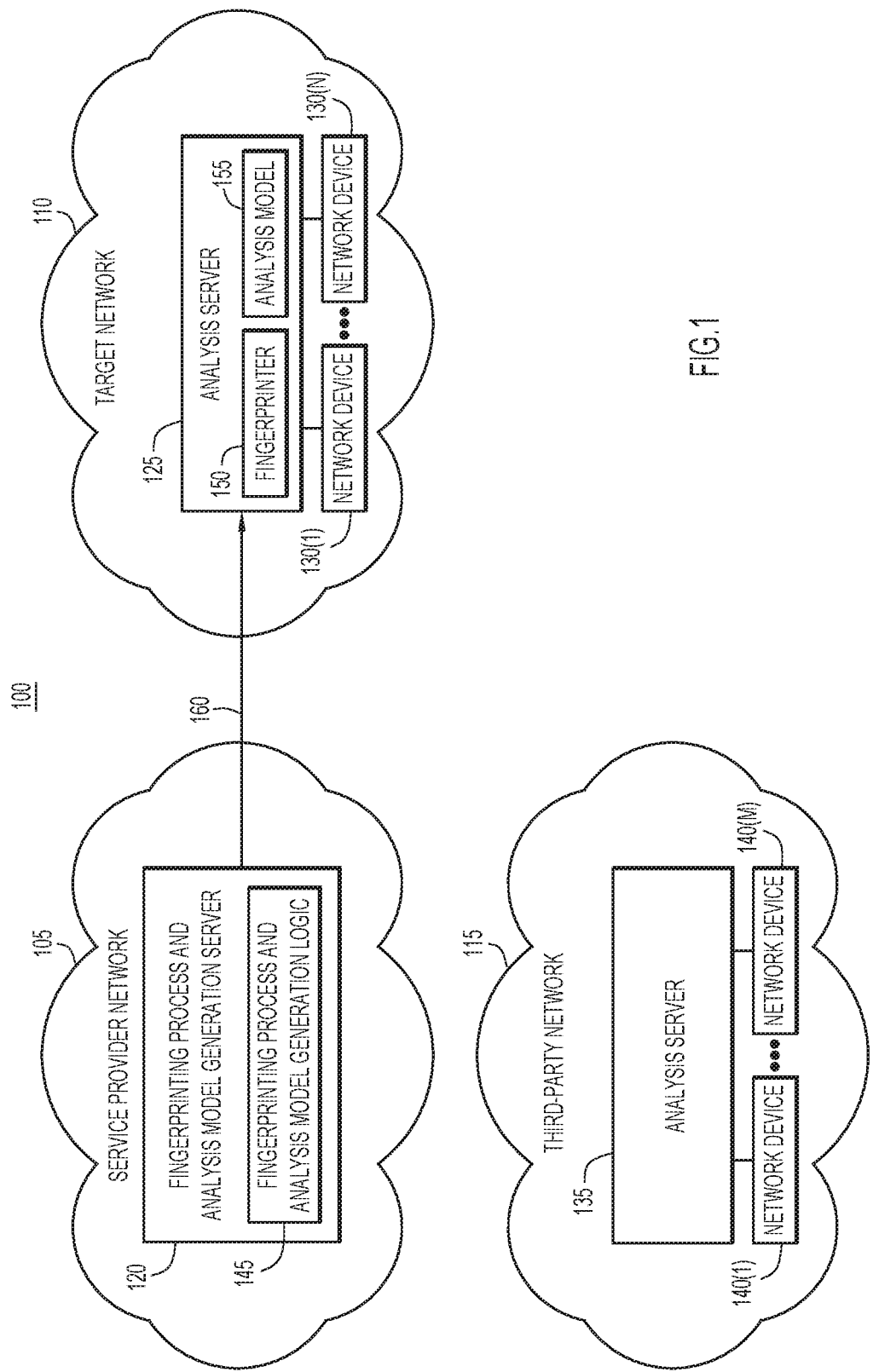
FIG. 1 illustrates a system for generating a uniquely compatible fingerprinting process and analysis model, according to an example embodiment.

FIG. 1 illustrates an example system 100 including service provider network 105, target network 110, and third-party network 115. Service provider network 105 includes fingerprinting process and analysis model generation server 120. Target network 110 includes analysis server 125 and network devices 130(1)-130(N). Third-party network 115 includes analysis server 135 and network devices 140(1)-140(M). Network devices 130(1)-130(N) and 140(1)-140(M) may include any suitable network devices, such as routers, switches, firewalls, etc. In one example, service provider network 105 may be associated with a service provider that manufactured and/or performs support and/or maintenance services for network devices 130(1)-130(N), and target network 110 may be associated with a customer of the service provider.

Analysis server 125 is configured to perform issue detection in target network 110 (e.g., to detect issues with one or more of the network devices 130(1)-130(N) that may arise from time-to-time). Examples of issues may include problems that can impact network performance, availability, security, etc. Typically, detection of issues with network devices 130(1)-130(N) would occur on service provider network 105. In particular, service provider network 105 would obtain, from target network 110, raw data produced by network devices 130(1)-130(N) related to configurations of, and operations performed by, the network devices 130(1)-130(N), analyze the raw data to detect any issues, and provide an indication of the detected issues to target network 110. However, requiring the customer to provide the raw data to service provider network 105 can create security concerns, particularly if the raw data includes sensitive/confidential/proprietary information of a customer that operates that target network 110. Accordingly, fingerprinting process and analysis model generation logic 145 is provided to enable issue detection to be performed on-premise (e.g., within target network 110), without exposing raw data to service provider network 105, as described below.

In one example, fingerprinting process and analysis model generation logic 145 may cause fingerprinting process and analysis model generation server 120 to obtain a plurality of code modules configured to identify issues in network devices 130(1)-130(N) of the target network 110. Based on the plurality of code modules, fingerprinting process and analysis model generation server 120 may generate fingerprinting process (also referred to herein as "fingerprinter") 150 and analysis model 155. Fingerprinter 150 is configured to produce a fingerprint that includes a plurality of key-value pairs. Each key of the plurality of key-value pairs is a unique key (e.g., a globally unique key) that corresponds to select data associated with raw data obtained from network devices 130(1)-130(N). The raw data may be produced by network devices 130(1)-130(N) and may be related to configurations of, and operations performed by, the network devices 130(1)-130(N). Each value of the plurality of key-value pairs represents information regarding the select data. The select data and the information regarding the select data may, for example, be relevant to determination of the presence or absence of a given issue.

Also based on the plurality of code modules, fingerprinting process and analysis model generation server 120 may generate analysis model 155. Analysis model 155 is uniquely compatible with fingerprinter 150, and may be configured to identify the issues in the network devices 130(1)-130(N) based on the key-value pairs. As represented by arrow 160, fingerprinting process and analysis model generation server 120 may provide fingerprinter 150 and analysis model 155 to analysis server 125 residing in the target network 110. Fingerprinter 150 and analysis model 155 may be provided as software and/or as an appliance running as an independent application, or installed on a networking device. Analysis server 125 may identify, by analysis model 155, the issues in network devices 130(1)-130(N) based on fingerprinter 150. This issue detection may occur on-premise (e.g., at target network 110) rather than at service provider network 105.

Figure 2:
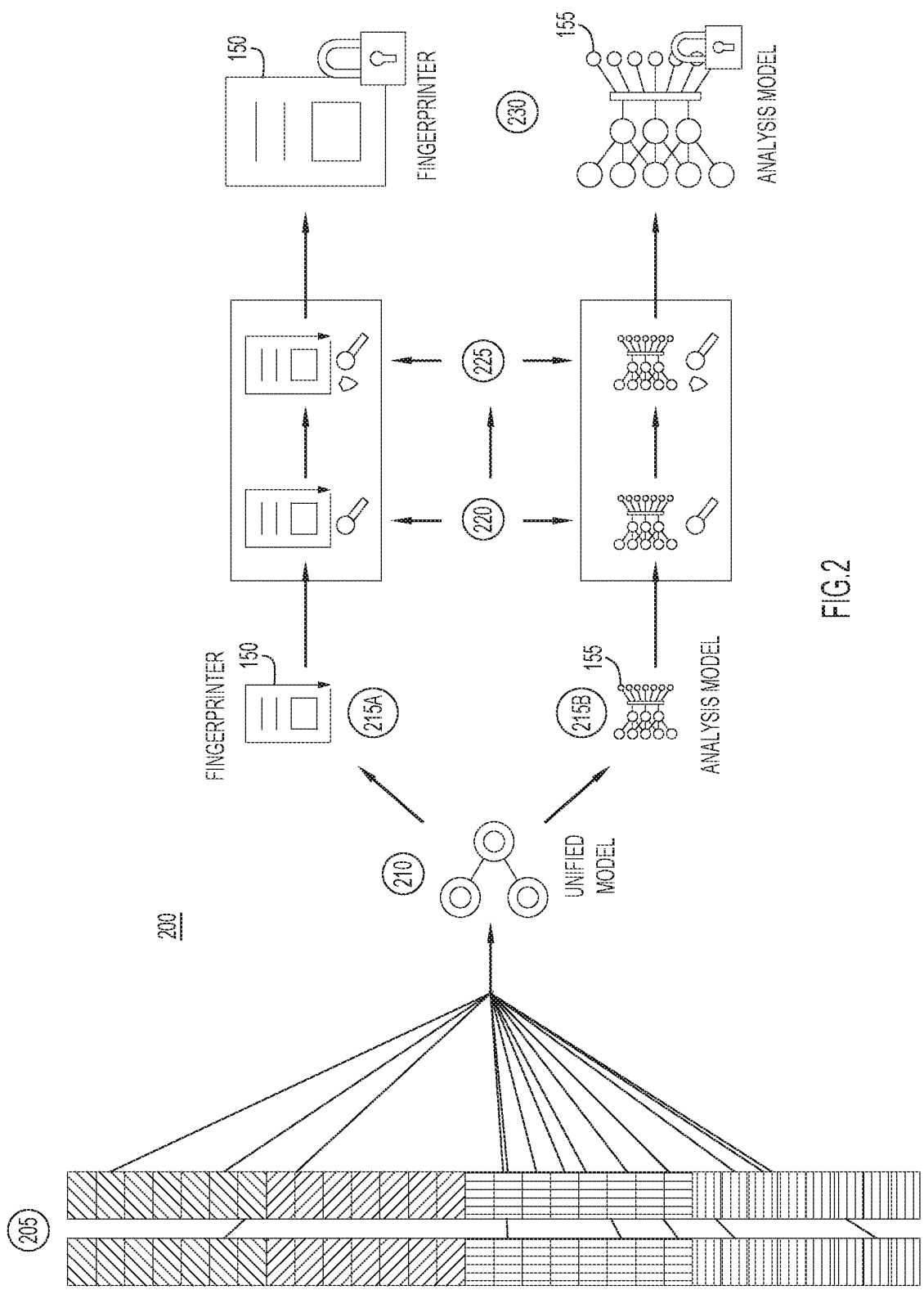
FIG. 2 illustrates a workflow for generating a uniquely compatible fingerprinting process and analysis model, according to an example embodiment.

With continued reference to FIG. 1, reference is now made to FIG. 2. FIG. 2 illustrates an example workflow 200 for generating fingerprinter 150 and analysis model 155. At 205, code modules specific to target network 110 are selected from a library of code modules in order to create a custom rule set. Selection of the specific code modules may be performed manually by subject matter experts and/or automatically based on information gathered or known about target network 110 (e.g., properties of network devices 130(1)-130(N)). In one example, manual high-level customization may be followed by automatic determination of which code modules to include or exclude for generating of fingerprinter 150 and analysis model 155.

At 210, a representation of each of the selected code modules is generated in a common format, referred to herein as a "unified model." The unified model may include a name for each given code module, commands needed to run the code module, feature mapping (e.g., Machine Learning (ML) feature mapping, in case analysis model 155 is a ML model), product support for each code module, and a generalized output for each code module, including issue alerts, missing data alerts, and no issue alerts. The unified model may be created, for example, based on a knowledge repository that collects code modules from different sources. The representation of the plurality of code modules in the common format may further be modified for target network 110. In particular, the unified model may include an instruction set that indicates how to reconstruct the selected code modules and convert them into fingerprinter 150 and analysis model 155. That is, fingerprinter 150 and analysis model 155 may be generated based on the unified model.

A unified model may be customized for, that is unique per, a given customer, product, device, etc. If customized per customer, the unified model may be stored in a database per customer. Also or alternatively, the unified model may be unique per device if fingerprinter 150 and analysis model 155 are locally executed on the relevant device.

The unified model may include a parser/fingerprinter configuration for respective code modules and an analysis model configuration for the respective code modules. The fingerprinter configuration may guide the generation of fingerprinter 150. The fingerprinter configuration may be a JavaScript Object Notation (JSON) object that includes a list of feature configurations. Each feature configuration may include a regular expression (regex) identifying select data required to be extracted to run the code module, a feature identifier (ID) that is randomly and dynamically created and maps to the regex, and feature salt which may be applied in fingerprinter 150 for further protection. Other mechanisms may be used to identify important features and extract statistics regarding those important features instead of or in addition to regex, such as JSON path querying or fuzzy matching. The feature IDs may be unique per feature and per customer. For example, each feature ID may be unique to fingerprinter 150 and analysis model 155, which are intended for target network 110. The feature ID may be the keys of the plurality of key-value pairs discussed above (or may be used to derive such keys, e.g., based on the feature salts).

The analysis model configuration may include instructions for rebuilding code modules and sample settings/parameters/values to be used in generating analysis model 155. For example, in case analysis model 155 is an ML model, the analysis model configuration may be used to train analysis model 155. In particular, analysis model 155 may be trained based on the sample settings/parameters/values and the feature IDs and/or feature salts used to generate fingerprinter 150. The analysis model configuration may include code module objects, each of which represents a code module. Each code module object may include a feature ID, a feature salt, a logical operation to be captured in analysis model 155, training data location, and a location of the collected training dataset. The feature ID and/or feature salt for a given code module object (e.g., associated with analysis model 155) may be substantially the same as the feature ID and/or feature salt in a corresponding feature configuration (e.g., associated with fingerprinter 150). This ensures that fingerprinter 150 and analysis model 155 are uniquely compatible, and in particular that a fingerprint generated by fingerprinter 150 may be successfully used as input by analysis model 155.

At 215A and 215B, fingerprinter 150 and analysis model 155 may be generated based on the unified model. In the case in which analysis model 155 is a ML model, for example, analysis model 155 may be trained based on the unified model to accept as input fingerprints generated by fingerprinter 150. Analysis model 155 may be persisted by converting the format of analysis model 155 to a file. In one example, each code module may have a respective analysis model (e.g., analysis model 155 may include a plurality of analysis models, or may be one of a plurality of analysis models).

At 220, one or more limitations are placed on the use of fingerprinter 150 and/or analysis model 155. This may include setting a time window during which fingerprinter 150 and/or analysis model 155 can be executed, and/or limiting a number of possible runs of fingerprinter 150 and/or analysis model 155 (e.g., using a token). For example, fingerprinter 150 and/or analysis model 155 may be configured to execute a specified number of times before a new key is required to be input.

At 225, fingerprinter 150 and/or analysis model 155 may be encrypted for further protection. More specifically, the software product used to execute fingerprinter 150 and/or analysis model 155 may be encrypted in any suitable format (e.g., as RSA key pairs). The customer may be required to input a password/passphrase to decrypt fingerprinter 150 and/or analysis model 155. At 230, fingerprinter 150 and analysis model 155 are generated with the one or more limitations and in an encrypted format.

Figure 3:
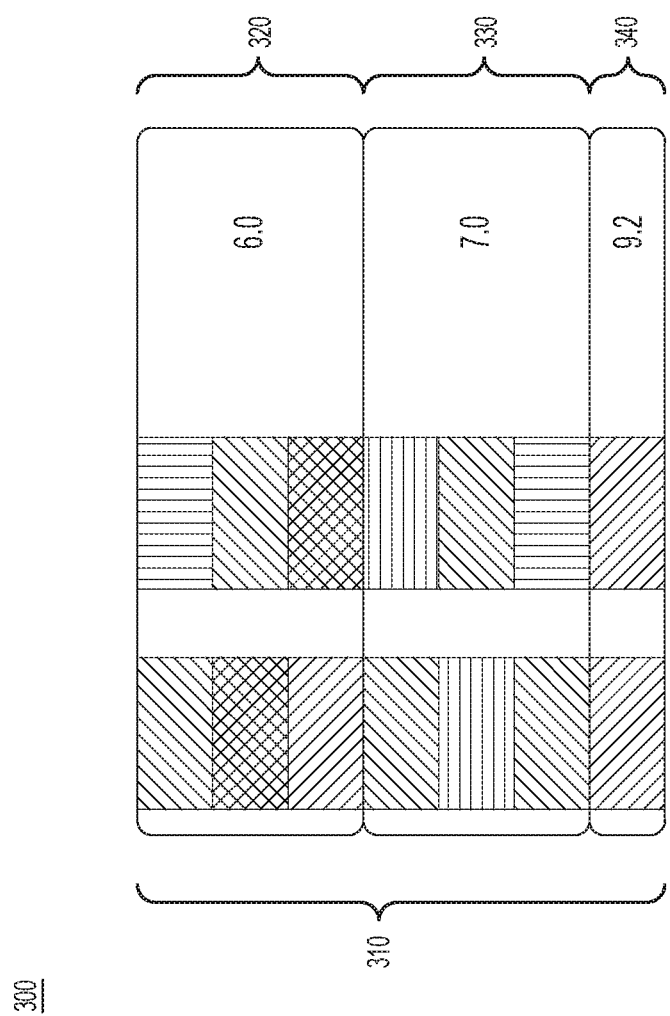
FIG. 3 illustrates a diagrammatic representation of various factors for selection of code modules used to generate the uniquely compatible fingerprinting process and analysis model, according to an example embodiment.

With continued reference to FIGS. 1 and 2, reference is now made to FIG. 3. FIG. 3 illustrates an example diagrammatic representation 300 of various factors for selection of code modules at 205. These factors may be used as high-level filtering inputs to add or remove code modules. Examples of these factors include the name(s) of one or more platforms, Operating Systems (OSs), and/or products used by network devices 130(1)-130(N) (e.g., iOS, Unified Computing System (UCS), Next-Generation Firewall (NGFW), Nexus OS (NX-OS), etc.); a version of hardware or software running on network devices 130(1)-130(N); a specific feature name; commands or files/filenames; code module context (e.g., text describing the code module); code module name/type; etc. Any suitable factor may be used.

In the specific example of FIG. 3, the customer may provide information regarding network devices 130(1)-130(N). A subject matter expert may select certain factors based on the information. In this case, the subject matter expert selects factors including NX-OS, software versions 6.0, 7.0, and 9.2, and other specific features, which are utilized by network devices 130(1)-130(N). In another example, the customer may select the factors and perform this customization/filtering as a self-service. In any event, based on these factors, fingerprinting process and analysis model generation server 120 may automatically determine/identify/select a bespoke set of code modules with high applicability to target network 110. The code modules are grouped in set 310 based on the NX-OS factor, and are further divided into subsets 320, 330, and 340 based on the software versions. Those code modules may be used to generate fingerprinter 150 and analysis model 155.

Figure 4:
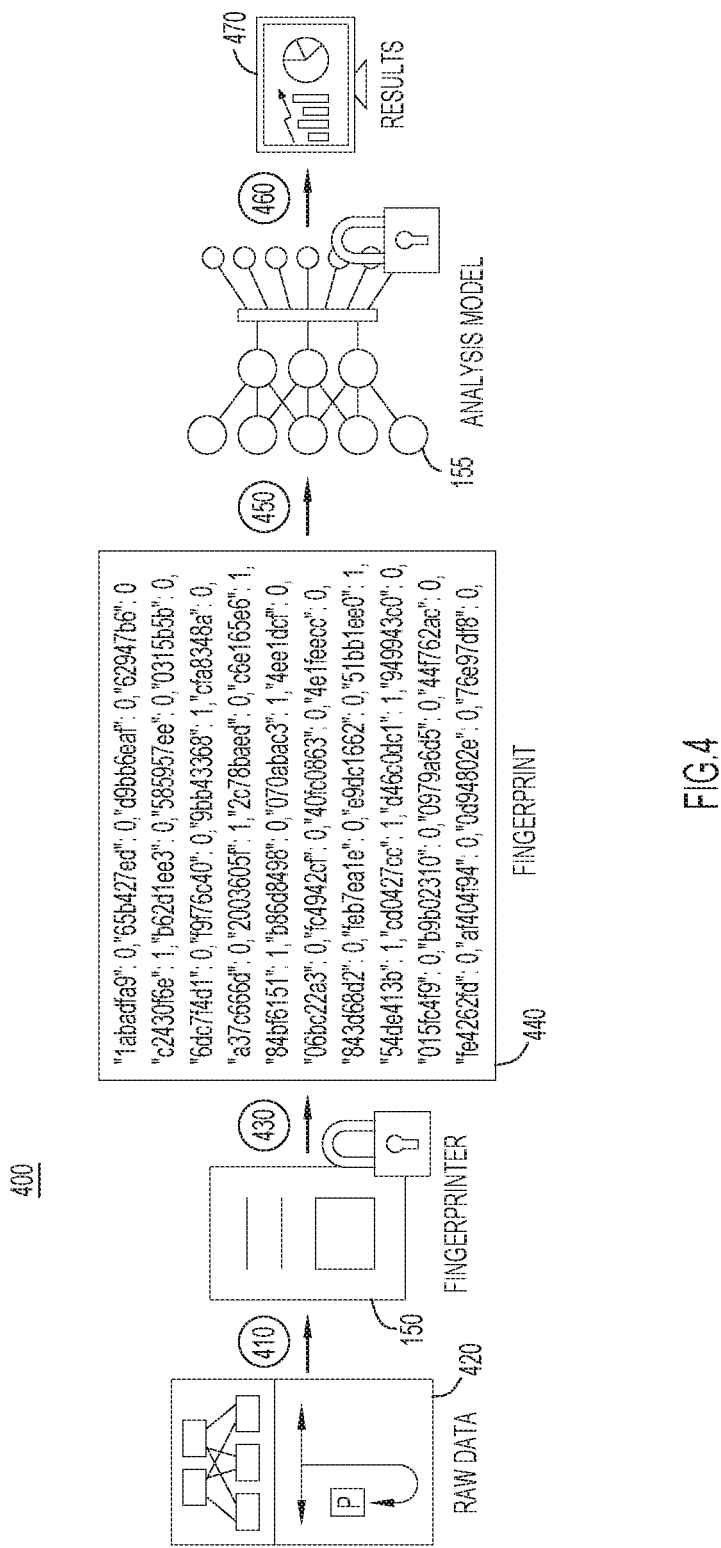
FIG. 4 illustrates a workflow for execution of a uniquely compatible fingerprinting process and analysis model, according to an example embodiment.

With continued reference to FIG. 1, FIG. 4 illustrates an example workflow 400 for execution of fingerprinter 150 and analysis model 155. In this example, fingerprinter 150 and analysis model 155 have been generated and provided to target network 110. At 410, fingerprinter 150 accepts as input raw data 420. Raw data 420 may include metadata generated by one or more of network devices 130(1)-130(N) (e.g., network device 130(I)). Raw data 420 may also include syslog messages, device configuration(s), operational data describing the health or status of a feature, device feature specific outputs, debugging outputs, etc. Fingerprinter 150 may obtain the raw data through Telnet, Secure Shell protocol (SSH), an Application Programming Interface (API), one or more files, etc. At 430, fingerprinter 150 generates fingerprint 440, destroys raw data 420, and caches fingerprint 440. At 450, fingerprinter 150 injects fingerprint 440 into analysis model 155, which is run on fingerprint 440. Analysis model 155 may, for example, return a value for each code module, where a negative value indicates that network device 130(I) is not impacted by the issue, and a positive value indicates that network device 130(I) is impacted by the issue. At 460, analysis model 155 retrieves/outputs results 470 indicating the existence of any issues with one or more of network devices 130(1)-130(N). Results 470 may be in any suitable human-readable (e.g., textual, graphical, etc.) format to indicate to the customer the problem (e.g., the presence of an issue) and/or the solution to the problem (e.g., how to resolve the issue).

Fingerprint 440 includes a plurality of key-value pairs (e.g., [labadfa9, 0], [65b427ed, 0], etc.). Each key of the plurality of key-value pairs (e.g., "labadfa9," "65b427ed," etc.) is a unique key that corresponds to select data associated with raw data obtained from the one or more network devices. For example, "labadfa9" may be a feature ID that uniquely corresponds to a regex (e.g., including text, numbers, symbols, etc.) associated with, or used to detect, an issue.

Each value of the plurality of key-value pairs (e.g., "0" or "1") represents information regarding the select data. The values may indicate a presence or an absence of the select data in the raw data (e.g., a categorical output). For example, a "0" may be a "true" indication (i.e., the select data is present) and a "1" may be a "false" indication (i.e., the select data is absent). It will be appreciated that in other examples "0" may be a "false" indication and "1" may be a "true" indication. The values may also/alternatively indicate a numerical value associated with the select data (e.g., a software version). The exact number may be salted using a random value for the salt, on a per-key basis for further obfuscation (e.g., a "0" at one key may correspond to "10," while a "0" at another key may correspond to "20").

Fingerprint 440 may be further obfuscated such that the values are not human-readable or in order to hide which values correspond to which keys. In case analysis model 155 is a ML model, analysis model 155 may be trained using these the unique keys/values (and based on any salting or other/further obfuscation techniques utilized by fingerprinter 150). This ensures that results 470 is accurately provided in response to analysis model 155 receiving fingerprint 440 as an input. For example, analysis model 155 may analyze fingerprint 440 on the basis of any suitable number of code modules (e.g., tens of thousands) and determine, for each code module, whether there is a corresponding issue.

The information carried by fingerprint 440 is secured through a number of precautions. For example, the feature IDs are random and unique, which ensures that the correspondence to the code modules remains opaque. Fingerprint 440 may also be salted and otherwise obfuscated so as to further protect the information therein. Also, in addition to security, another benefit of fingerprint 440 is that it is computationally efficient. In particular, fingerprinter 150 takes raw data 420 as input (e.g., an input file of a large data set), extracts relevant/select data therefrom, and outputs fingerprint 440. Raw data 420 may be on the order of gigabytes, whereas fingerprint 440 may be on the order of kilobytes. Fingerprint 440 may use less memory and computing power than raw data 420, and may be processed faster.

After being generated, fingerprinter 150 and/or analysis model 155 may require an update (e.g., due to a software update). To effectuate the update, the fingerprinter configuration and analysis model configuration of a given code module may be regenerated at service provider network 105 and provided to target network 110 for installation. This regeneration may be for a partial update or a full update. For partial updates, a new fingerprinter configuration and analysis model configuration may be added to the original/previous fingerprinter configuration(s) and analysis model configuration(s). Full updates may involve rebuilding a new fingerprinter and analysis model from scratch when there is an update. For example, a device version upgrade may require a full upgrade. An historical record of factors used for selection of code modules may be maintained to ensure the quality of updates provided to the customer. The fingerprinter code and analysis model code may have a fixed architecture that does not require an update when a new code module is developed.

Figure 5:
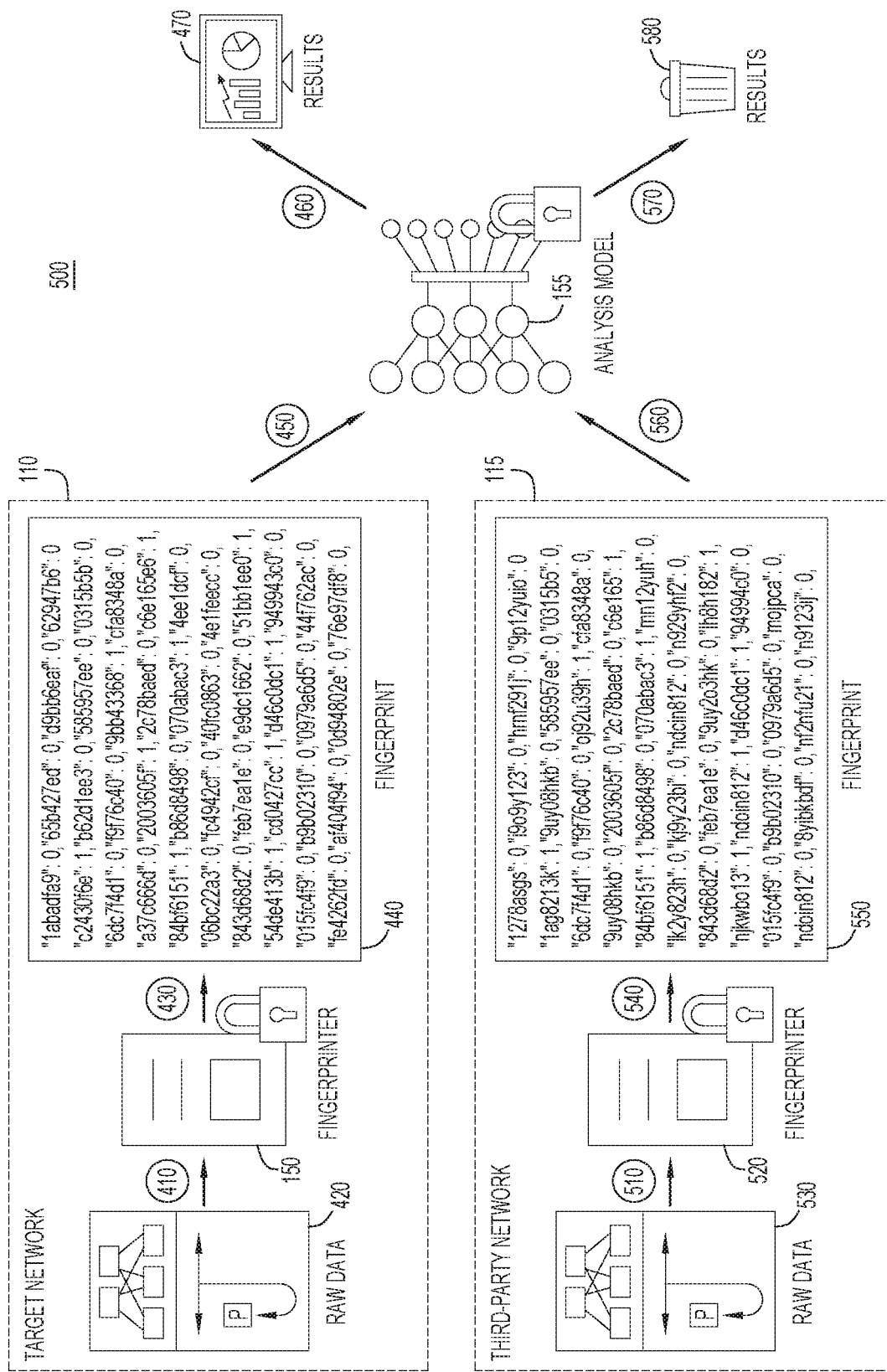
FIG. 5 illustrates a workflow for execution of a uniquely compatible fingerprinting process and analysis model, and execution of a fingerprinting process that is incompatible with the analysis model, according to an example embodiment.

FIG. 5 illustrates an example workflow 500 that demonstrates the uniquely compatible nature of fingerprinter 150 and analysis model 155. In this example, a bad actor associated with third-party network 115 has stolen analysis model 155 from target network 110 and has deployed an identical copy in third-party network 115 (e.g., at analysis server 135). At 510, fingerprinter 520 accepts raw data 530 as input. Fingerprinter 520 may be different from fingerprinter 150, and may be deployed in third-party network 115. Raw data 530 may be metadata generated by one or more of network devices 140(1)-140(M) (e.g., network device 140(I)). At 540, fingerprinter 520 generates fingerprint 550. As shown, fingerprint 550 is different from fingerprint 440 because raw data 530 is different from raw data 420, and furthermore fingerprinter 520 may be different from fingerprinter 150. At 560, fingerprinter 520 injects fingerprint 550 into analysis model 155. Analysis model 155 is run on fingerprint 550 and, at 570, retrieves/outputs results 580 indicating unintelligible or "garbage" results for one or more of network devices 140(1)-140(M). Results 580 are unintelligible even if network device 140(I) has identical hardware, software, and configuration to network device 130(I) (i.e., even if fingerprinter 520 ran on the same raw data).

Analysis model 155 cannot provide a meaningful output for fingerprint 550 because fingerprint 550 includes different feature IDs and/or values (and possibly different salting and/or obfuscation techniques) from those used to train analysis model 155. For example, analysis model 155 may have been trained with the key "labadfa9" as representing a given code module, whereas fingerprint 550 uses "1278asgs" as the key to represent the same code module. Analysis model 155 is able to successfully analyze fingerprint 440 because fingerprint 440 includes the key "labadfa9." By contrast, analysis model 155 cannot successfully process fingerprint 550 because fingerprint 550 includes keys (e.g., key "1278asgs") that analysis model 155 was not trained with. Fingerprint 440 may only be properly decoded by analysis model 155, and fingerprint 550 may only be properly decoded by its peer analysis model.

This example demonstrates how the unique compatibility (pairwise relationship) of fingerprinter 150 and analysis model 155 protects against theft and unauthorized use of analysis model 155. In particular, using the same set of unique feature IDs to generated fingerprinter 150 and analysis model 155 forms a unique code module execution space to prevent a bad actor associated with third-party network 115 from stealing analysis model 155 (or fingerprinter 150) from target network 110 for detection of issues associated with network devices 140(1)-140(M). The bad actor thus cannot re-use analysis model 155 as a "black box," inputting raw data regarding network devices 140(1)-140(M) and obtaining issue detection results as an output. The bad actor is also prohibited from re-selling analysis model 155 for use in other networks and/or re-running analysis model 155 in any number of networks. Thus, packaging/joining fingerprinter 150, analysis model training, and analysis model 155 as described herein may produce results only for a specific customer.

Moreover, analysis model 155 is trained specifically for target network 110 based on a bespoke set of code modules (e.g., selected based on network devices 130(1)-130(N)). This ensures that analysis model 155 produces incorrect/irrelevant/unintelligible results for third-party network 115 because analysis model 155 was not trained based on the code modules pertaining to third-party network 115. Fingerprinter 150 and analysis model 155 may be further protected by adding a token to limit the number of runs of fingerprinter 150 and/or analysis model 155 based on a count or a time period. In addition, a Secure Unique Device Identifier (SUDI) may be used to authenticate fingerprinter 150 and/or analysis model 155 prior to execution where both fingerprinter 150 and analysis model 155 are executed on-device.

Thus, the techniques described herein provide layered security for a number of scenarios. If either a fingerprinter or an analysis model is stolen, it provides no value to a bad actor by itself. If a bad actor steals an analysis model and has fingerprinter that is not uniquely compatible with the stolen analysis model, or if the bad actor steals a fingerprinter and has an analysis model that is not uniquely compatible to the stolen fingerprinter, the bad actor will only obtain unintelligible results. If the bad actor steals both the fingerprinter and analysis model and they are encrypted, the bad actor cannot run them without the decryption keys. Finally, even if the bad actor steals the fingerprinter, the analysis model, and the decryption key, the bad actor would only obtain limited value because the bespoke unified model was trained based on the network devices, versions, configurations, traffic patterns, etc. for the target network.

Figure 6:
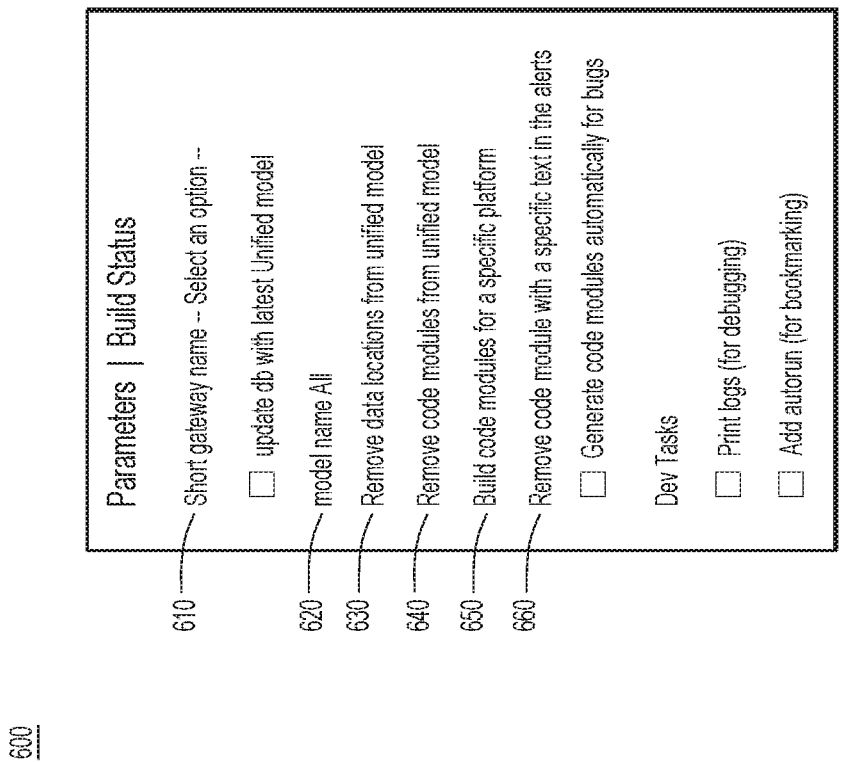
FIG. 6 illustrates an example user interface for building a unified model to generate a uniquely compatible fingerprinting process and analysis model, according to an example embodiment.

FIG. 6 illustrates an example user interface 600 for building a unified model to represent any code module in a common format. Short gateway name field 610 may allow a subject matter expert to specify the technology to which the unified model applies (e.g., Adaptive Security Appliance (ASA), UCS, all technologies, etc.). Model name field 620 may allow the subject matter expert to assign a unique name assigned to the unified model, and may reference a given customer (e.g., if the unified model is customized for a given customer). User interface 600 also provides high-level filtering in the form of data location filter field 630, code module filter field 640, platform filter field 650, and text filter field 660. Data location filter field 630 may allow the subject matter expert to list commands or file paths to be removed from the unified model. Code module filter field 640 may allow the subject matter expert to list code module names to be removed from the unified model. Platform filter field 650 may allow the subject matter expert to provide a list of platform names used to add code modules built for specific platforms. Text filter field 660 may allow the subject matter expert to remove a code module with specified text in associated alerts. User interface 600 may be used by the subject matter expert to generate the fingerprinter and analysis model (e.g., before the fingerprinter and analysis model are provided to the customer).

Figure 7:
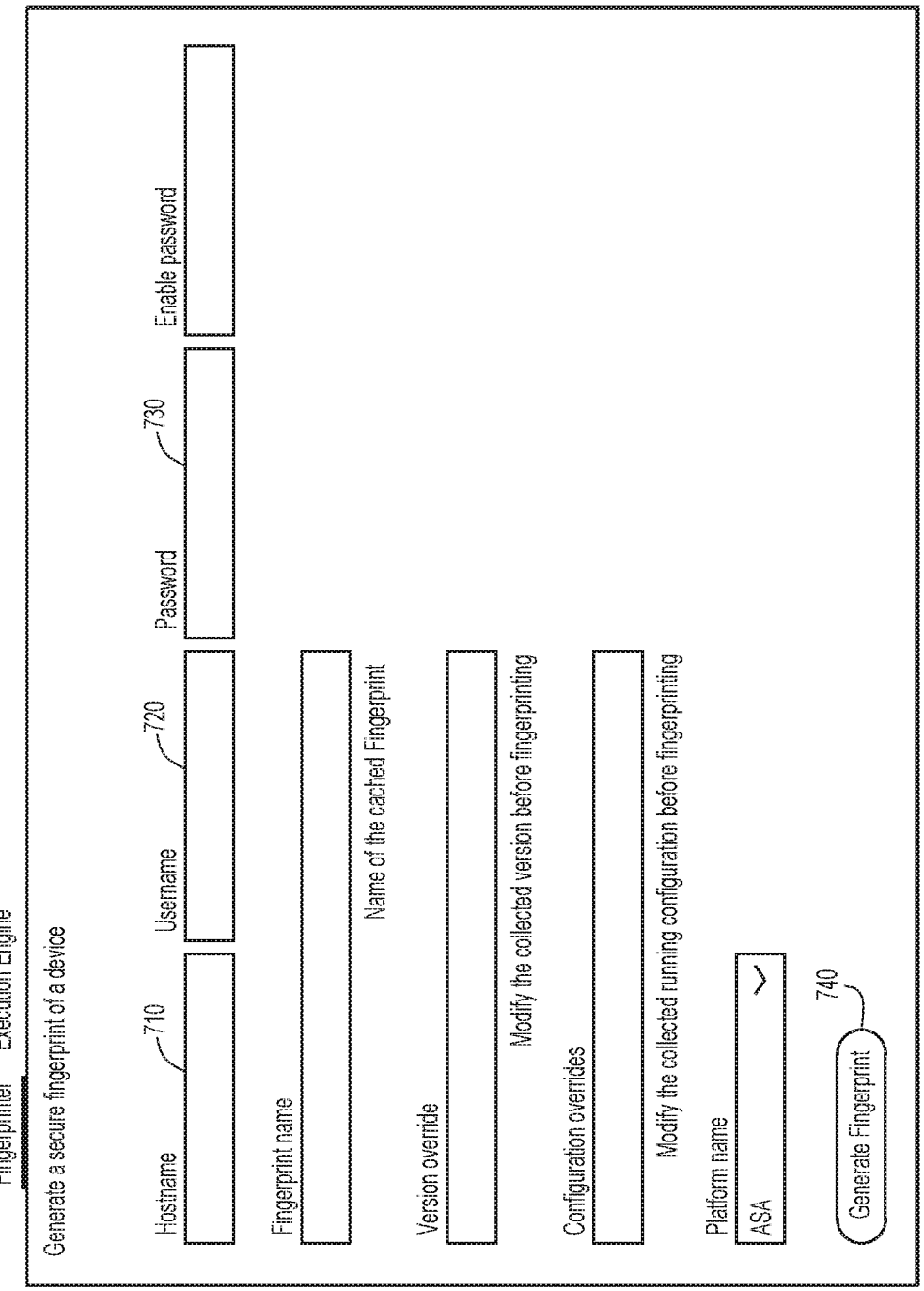
FIG. 7 illustrates a user interface that enables a user to run a fingerprinting process on raw data obtained from a network device, according to an example embodiment.

FIG. 7 illustrates an example user interface 700 that enables a customer to run a fingerprinter on raw data obtained from a network device. User interface 700 includes hostname field 710 to specify one or more devices, user name field 720, password field 730, and generate fingerprint button 740. Hostname field 710 allows the customer to provide a host name of a network device (e.g., a switch or a firewall). User name field 720 and password field 730 permit the customer to provide a user name and a password, respectively. Generate fingerprint button 740, when selected by the customer, prompts the fingerprinter to generate a fingerprint of the raw data obtained from the one or more specified devices.

Figure 8:
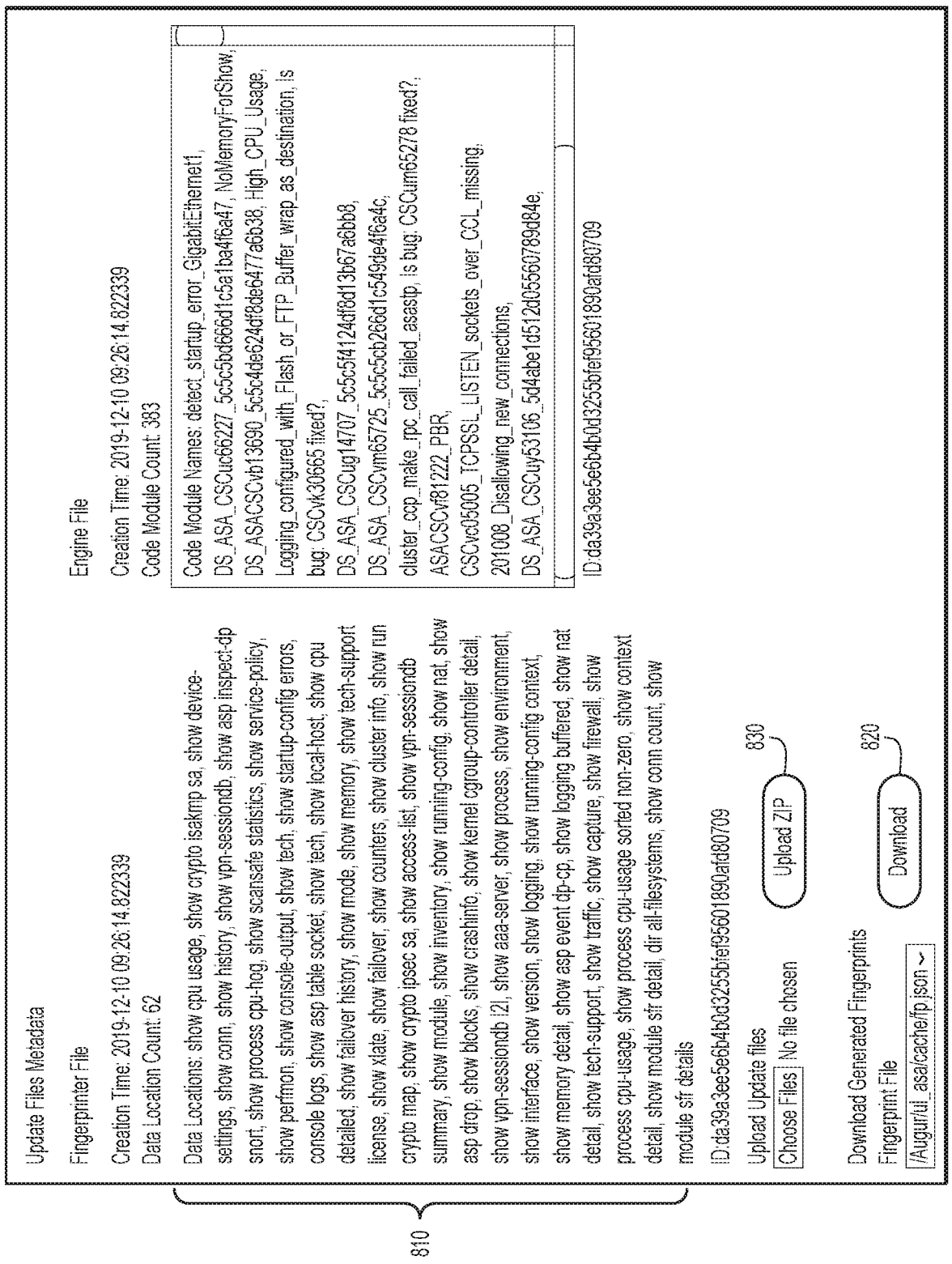
FIG. 8 illustrates a user interface that indicates to a user how a fingerprinting process obtains raw data from a network device, according to an example embodiment.

FIG. 8 illustrates an example user interface 800 that indicates to the customer how the fingerprinter may obtain raw data from a network device. User interface 800 includes data locations display 810, download button 820, and upload zip button 830. Data locations display 810 lists commands that the fingerprinter runs automatically, based on the given code modules, to reveal the raw data. One such command is "show version." After running these commands, the fingerprinter may parse the raw data, identify specified regex, map the regex to the relevant feature ID, and thereby generate a fingerprint of the raw data. The fingerprinter may further salt and otherwise obfuscate the fingerprint. Download button 820, when selected by the customer, prompts the generated fingerprint to be downloaded. When selected by the customer, upload zip button 830 permits the customer to upload any update files before generating the fingerprint.

FIG. 9 illustrates an example display 900 of raw data parsed by a fingerprinter. In this example, the raw data is obtained from a network device via the "show version" command. As shown, the network device is running major version 6, minor release 2, and maintenance release 17. The customer does not necessarily need to view display 900 because the fingerprinter parses this raw data automatically.

FIG. 10 illustrates an example user interface 1000 that displays a fingerprint 1010 generated by a fingerprinter. Fingerprint 1010 may be hidden (e.g., not viewable) for security purposes. Fingerprint 1010 includes a timestamp 1020 indicating a time at which fingerprint 1010 was created, a gateway 1030 for which the fingerprinter is designed, and a name 1040 assigned to fingerprint 1010. Fingerprint 1010 also includes a plurality of key-value pairs (e.g., key-value pair 1050). Fingerprint 1010 may include any suitable number of key-value pairs (e.g., on the order of thousands).

Fingerprint 1010 may include at least two types of information that are encoded as features: product metadata and issue statistics. Product metadata may include software version and hardware information, and issue statistics may include specific information to be extracted from raw data. Key-value pair 1050 may relate to product metadata, and may indicate that a network device is running a given software version based on raw data obtained via the "show version" command. In this example, the network device software version is 6.2.17. The fingerprinter may parse the version into the following fields: major release (e.g., 6), minor release (e.g., 2), maintenance release (e.g., 17), and additional (e.g., 0). These numbers may be salted during fingerprinting. The unified model defines a feature ID per version field, thus enabling the fingerprinter to map each extracted version field to a feature ID. For example, the feature ID (key) in key-value pair 1050 may correspond to the major release, and the value may correspond to 6.

Other keys in fingerprint 1010 may relate to issue statistics. For example, other keys in fingerprint 1010 may include a feature ID corresponding to a specific log message in the device system log data obtained from the device health assessment output, and the corresponding values may indicate whether the log message is present in the device system log. Still other keys in fingerprint 1010 may correspond to specific configuration commands in the device configuration, and the corresponding values may indicate whether the configuration command is present on the device. Other embodiments may also be envisioned.

Figure 11:
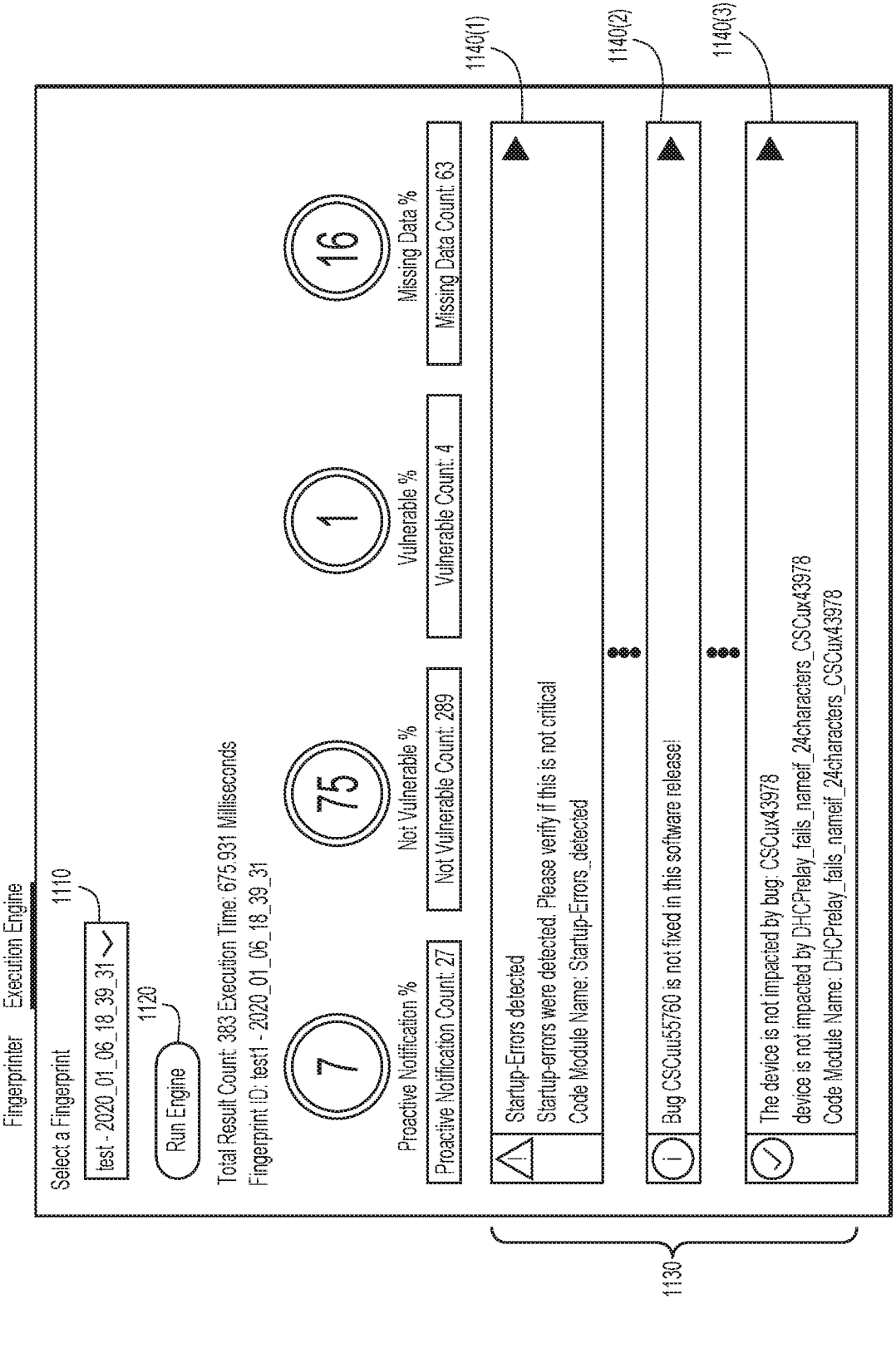
FIG. 11 illustrates a user interface that enables a user to prompt an analysis model to analyze a fingerprint generated by a fingerprinting process, according to an example embodiment.

FIG. 11 illustrates an example user interface 1100 that enables a customer to prompt an analysis model to analyze a fingerprint. User interface 1100 includes dropdown menu 1110, run engine button 1120, and results 1130. Dropdown menu 1110 permits the customer to select a fingerprint by name. Run engine button 1120, when selected by the customer, prompts the analysis model to analyze the selected fingerprint and display results 1130. Results 1130 may provide proactive notifications, issues for which the network device is not vulnerable, issues for which the network device is vulnerable, and issues for which the vulnerability could not be determined due to missing data. Here, 7% of results 1130 are proactive notifications, 75% are not vulnerable, 1% is vulnerable, and 16% could not be determined. Summaries of each of results 1130 (e.g., summaries 1140(1)-1140(3)) may be displayed. When a given summary is selected, more detail regarding that result may be displayed.

As discussed above, a fingerprinter may obtain device data (e.g., device raw health assessment data) and generate an obfuscated key-value pair based on the fingerprinter configuration. An engine that includes an analysis (e.g., ML) model, notification text, and recommended actions may obtain the key-value pair and produce the notification text and actions, which are provided to the user to recover from the issues reported. All analysis models may generate the same classes, each of which may represent a given insight (e.g., '0' may represent that the device(s) is/are not impacted by an issue, and a '1' may represent that the device(s) is/are impacted by the issue). The notification text may include text that is mapped to a given analysis model class, and may be used to supplement the '0' or '1'. The mapping between the notification text and class may be static, which is why the text may be included with the engine. The action items may indicate actions to be taken to resolve an issue automatically, and may include structured instructions that can be executed automatically or instructions to the device-end user. These actions may also be statically mapped to the analysis model classes.

The fingerprinter, analysis model, and notification and action mapping may be packaged in any suitable manner. In one example, the fingerprinter, analysis model, and notification and action mapping may be provided as a single package, which may result in a one execution phase. In another example, the fingerprinter may be provided as standalone package along with a combined package for the analysis module and notification and action mapping, which may result in two execution stages. In still another example, the fingerprinter, analysis model, and notification and action mapping may each be packaged independently, which may result in three execution stages.

FIGS. 12-16 relate to one or more embodiments whereby the actions and notification mapping is grouped separately from the fingerprinter and analysis model. That is, a fingerprinter may obtain device data (e.g., device raw health assessment data) and generate an obfuscated key-value pair based on the fingerprinter configuration. An engine that includes an analysis (e.g., ML) model may generate a series of obfuscated output classes. The output classes may be provided to the notification and action mapping, which provides notification text and actions to recover from the issues reported.

More specifically, during creation of the unified model, each analysis model obtains a randomly generated set of classes assigned thereto. This may include a mapping between the old class numbers (e.g., 1 and 0) to a new set of identifiers (e.g., class numbers). For example, '1' may be mapped to '2473' and '0' may be mapped to '4343'. Since the new class numbers are randomly generated, bad actors may be prevented from determining which class maps to a given insight. A mapping of the new class numbers to corresponding notifications and recovery actions may be generated by reference to the new class number in the notification and action mapping. This may involve indexing the notification text/actions.

Once the notifications text and actions are indexed based on the analysis model output, the notification text and actions may be detached from the engine and provided as an independent module. Thus, there may be three modules in the embodiment(s) of FIGS. 12-16: the fingerprinter module, engine module, and notification and actions module. The fingerprinter module (or fingerprinter) may parse data and generate a fingerprint (e.g., {"fe864afbc": 284, "fe864aecf": 832 . . . }). The engine module (e.g., analysis model) may identify insights from the fingerprint and generates classes corresponding to each insight (e.g., [247345, 34970, 2070531 . . . ]). The notification and actions module may map the insight classes generated by the engine module to corresponding human- or machine-consumable text alerts and actions, which can be returned to the user or can be executed automatically in order to remediate a detected issue.

Figure 12:
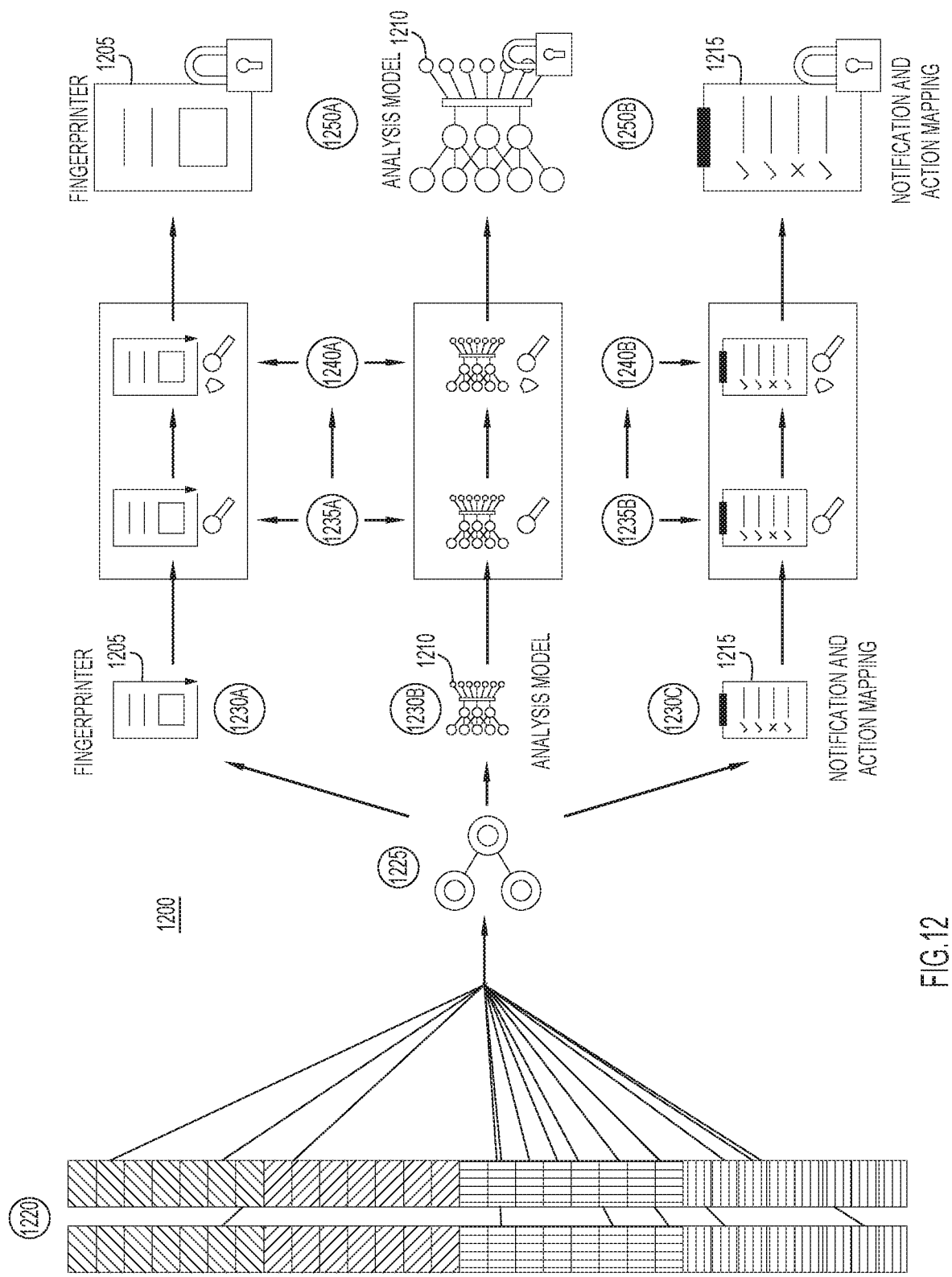
FIG. 12 illustrates a workflow for generating a uniquely compatible fingerprinting process, analysis model, and notification and action mapping, according to an example embodiment.

FIG. 12 illustrates an example workflow 1200 for generating a uniquely compatible fingerprinting process (fingerprinter 1205), analysis model (analysis model 1210), and notification and action mapping (notification and action mapping 1215). At 1220, code modules specific to target network 110 are selected from a library of code modules in order to create a custom rule set, similar to operation 205 (FIG. 2). Selection of the specific code modules may be performed manually by subject matter experts and/or automatically based on information gathered or known about target network 110. In one example, manual high-level customization may be followed by automatic determination of which code modules to include or exclude for generating of fingerprinter 1205, analysis model 1210, and notification and action mapping 1215.

At 1225, a representation of each of the selected code modules is generated in a common format (unified model), similar to operation 210 (FIG. 2). The unified model may include a name for each given code module, commands to run the code module, feature mapping (e.g., ML feature mapping), product support for each code module, and a generalized output for each code module, including issue alerts, missing data alerts, and no issue alerts. The unified model may be created, for example, based on a knowledge repository that collects code modules from different sources. The representation of the plurality of code modules in the common format may further be modified for target network 110. In particular, the unified model may include an instruction set that indicates how to reconstruct the selected code modules and convert them into fingerprinter 1205, analysis model 1210, and notification and action mapping 1215. That is, fingerprinter 1205, analysis model 1210, and notification and action mapping 1215 may be generated based on the unified model.

At 1230A, 1230B, and 1230C, fingerprinter 1205, analysis model 1210, and notification and action mapping 1215 may be generated based on the unified model. In the case in which analysis model 1210 is a ML model, for example, analysis model 1210 may be trained based on the unified model to accept as input fingerprints generated by fingerprinter 1205. Notification and action mapping 1215 may be configured to provide appropriate feedback to the user based on class numbers output by analysis model 1210. Analysis model 1210 may be persisted by converting the format of analysis model 1210 to a file. In one example, each code module may have a respective analysis model (e.g., analysis model 1210 may include a plurality of analysis models, or may be one of a plurality of analysis models).

At 1235A and 1235B, one or more limitations are placed on the use of fingerprinter 1205, analysis model 1210, and notification and action mapping 1215. This may include setting a time window during which fingerprinter 1205, analysis model 1210, and/or notification and action mapping 1215 can be executed, and/or limiting a number of possible runs of fingerprinter 1205, analysis model 1210, and/or notification and action mapping 1215 (e.g., using a token). For example, fingerprinter 1205, analysis model 1210, and/or notification and action mapping 1215 may be configured to execute a specified number of times before a new key is required to be input.

At 1240A and 1240B, fingerprinter 1205, analysis model 1210, and/or notification and action mapping 1215 may be encrypted for further protection. More specifically, the software product used to execute fingerprinter 1205, analysis model 1210, and/or notification and action mapping 1215 may be encrypted in any suitable format (e.g., as RSA key pairs). The customer may be required to input a password/passphrase to decrypt fingerprinter 1205, analysis model 1210, and/or notification and action mapping 1215. At 1250A and 1250B, fingerprinter 1205, analysis model 1210, and/or notification and action mapping 1215 are generated with the one or more limitations and in an encrypted format.

Figure 13:
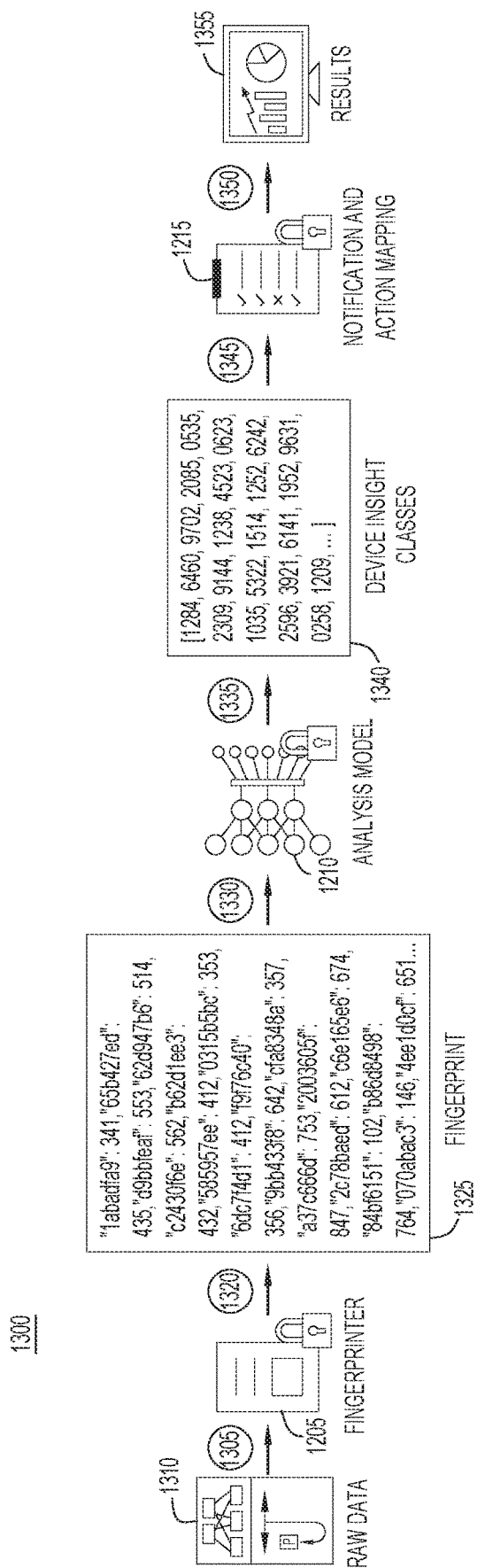
FIG. 13 illustrates a workflow for execution of a uniquely compatible fingerprinting process, analysis model, and notification and action mapping, according to an example embodiment.

FIG. 13 illustrates an example workflow 1300 for execution of fingerprinter 1205, analysis model 1210, and notification and action mapping 1215. In this example, fingerprinter 1205, analysis model 1210, and notification and action mapping 1215 have been generated and provided to target network 110. At 1305, fingerprinter 1205 accepts as input raw data 1310. Raw data 1310 may include metadata generated by one or more of network devices 130(1)-130(N), syslog messages, device configuration(s), operational data describing the health or status of a feature, device feature specific outputs, debugging outputs, etc. Fingerprinter 1205 may obtain the raw data through Telnet, SSH, an API, one or more files, etc. At 1320, fingerprinter 1205 generates fingerprint 1325, destroys raw data 1310, and caches fingerprint 1325. Fingerprint 1325 may be similar to fingerprint 440 (FIG. 4).

At 1330, fingerprinter 1205 injects fingerprint 1325 into analysis model 1210, which is run on fingerprint 1325. At 1335, analysis model 1210 may return device insight classes 1340 for one or more code modules indicating the existence of any issues with one or more of network devices 130(1)-

130(N). In one example, if the raw data for a given code module cannot be found/collected, that code module may not return a class. At 1345, notification and action mapping 1215 may obtain device insight classes 1340 and translate device insight classes 1340 into human-readable notification text and action recommendations. At 1350, notification and action mapping 1215 may provide the recommendations as results 1355. Results 1355 may be provided in any suitable human-readable (e.g., textual, graphical, etc.) format to indicate to the customer the problem (e.g., the presence of an issue) and/or the solution to the problem (e.g., how to resolve the issue). Results 1355 may additionally or alternatively be provided in a machine consumable format, allowing the consumption of results 1355 to be analyzed and acted upon to automatically remediate the identified problem.

Figure 14:
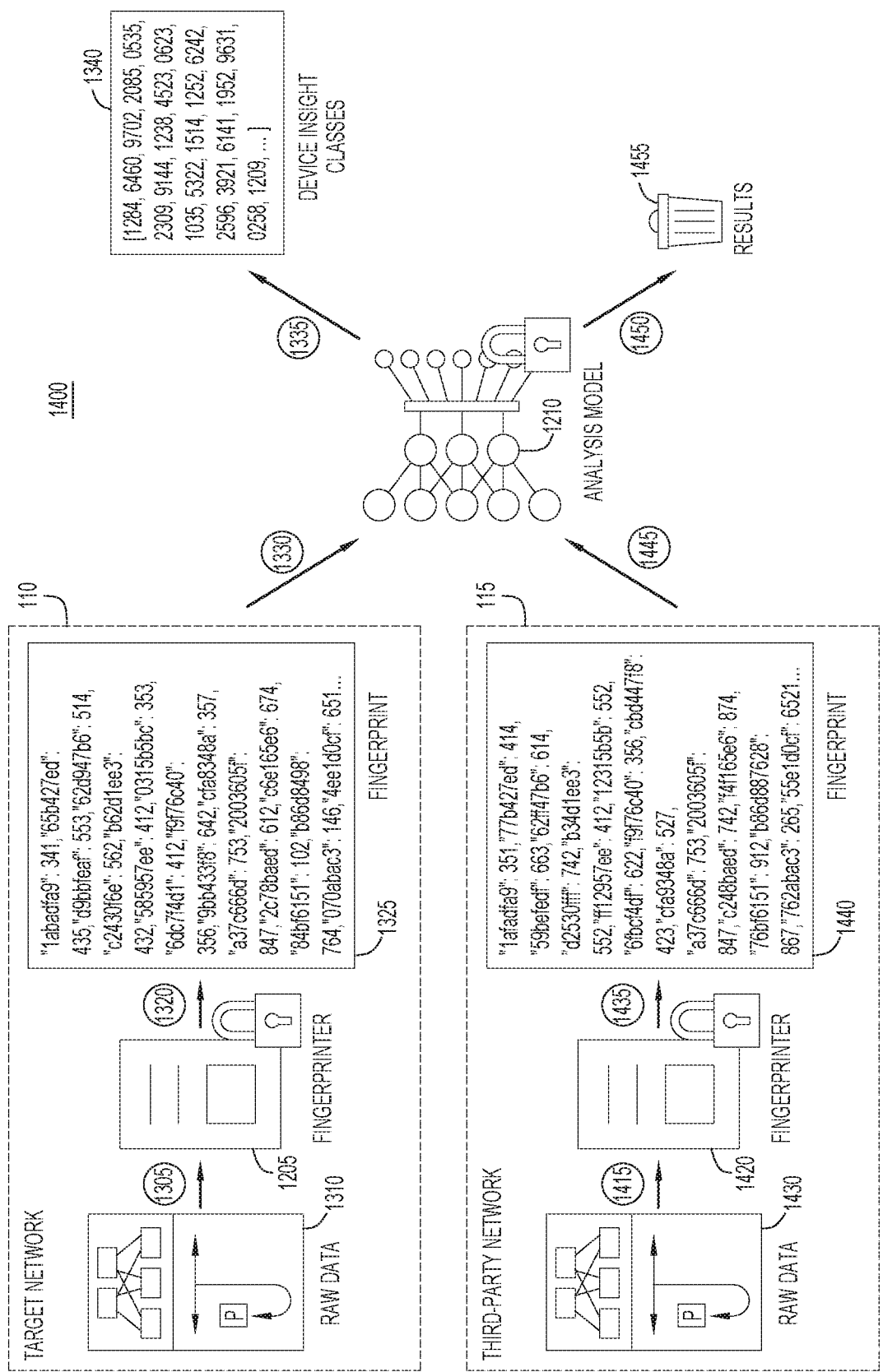
FIG. 14 illustrates another workflow for execution of a uniquely compatible fingerprinting process and analysis model, and execution of a fingerprinting process that is incompatible with the analysis model, according to an example embodiment.

FIG. 14 illustrates an example workflow 1400 that demonstrates the uniquely compatible nature of fingerprinter 1205 and analysis model 1210. In this example, the bad actor associated with third-party network 115 has stolen analysis model 1210 from target network 110 and has deployed an identical copy in third-party network 115. At 1415, fingerprinter 1420 accepts raw data 1430 as input. Fingerprinter 1420 may be different from fingerprinter 1205, and may be deployed in third-party network 115. Raw data 1430 may be metadata generated by one or more of network devices 140(1)-140(M). At 1435, fingerprinter 1420 generates fingerprint 1440. As shown, fingerprint 1440 is different from fingerprint 1325 because raw data 1430 is different from raw data 1310, and furthermore fingerprinter 1420 may be different from fingerprinter 1205. At 1445, fingerprinter 1420 injects fingerprint 1440 into analysis model 1210. Analysis model 1210 is run on fingerprint 1440 and, at 1450, retrieves/outputs results 1455 indicating unintelligible or "garbage" results. Results 1455 are unintelligible even if the network device(s) from third-party network 115 and the network device(s) from target network 110 have identical hardware, software, and configurations (i.e., even if fingerprinter 1420 ran on the same raw data as fingerprinter 1205).

Analysis model 1210 cannot provide a meaningful output of device insight classes for fingerprint 1440 because fingerprint 1440 includes different feature IDs and/or values (and possibly different salting and/or obfuscation techniques) from those used to train analysis model 1210. For example, analysis model 1210 may have been trained with the different keys and/or values than those used in fingerprint 1440. Analysis model 1210 is able to successfully analyze fingerprint 1325 because fingerprint 1325 includes the keys and values with which analysis model 1210 was trained. By contrast, analysis model 1210 cannot successfully process fingerprint 1440 because fingerprint 1440 includes keys and values with which analysis model 1210 was not trained. Fingerprint 1325 may only be properly decoded by analysis model 1210, and fingerprint 1440 may only be properly decoded by its peer analysis model.

This example demonstrates how the unique compatibility (pairwise relationship) of fingerprinter 1205 and analysis model 1210 protects against theft and unauthorized use of analysis model 1210. In particular, using the same set of unique feature IDs to generate fingerprinter 1205 and analysis model 1210 forms a unique code module execution space to prevent a bad actor associated with third-party network 115 from stealing analysis model 1210 (or fingerprinter 1205) from target network 110 for detection of issues associated with network devices 140(1)-140(M). The bad actor thus cannot re-use analysis model 1210 as a "black box," inputting raw data regarding network devices 140(1)-140(M) and obtaining device insight classes results as an output. The bad actor is also prohibited from re-selling analysis model 1210 for use in other networks and/or re-running analysis model 1210 in any number of networks. Thus, packaging/joining fingerprinter 1205, analysis model training, and analysis model 1210 as described herein may produce results only for a specific customer.

Moreover, analysis model 1210 is trained specifically for target network 110 based on a bespoke set of code modules. This ensures that analysis model 1210 produces incorrect/irrelevant/unintelligible device insight classes for third-party network 115 because analysis model 1210 was not trained based on the code modules pertaining to third-party network 115. Fingerprinter 1205, analysis model 1210, and/or notification and action mapping 1215 may be further protected by adding a token to limit the number of runs of fingerprinter 1205, analysis model 1210, and/or notification and action mapping 1215 based on a count or a time period. In addition, a SUDI may be used to authenticate fingerprinter 1205, analysis model 1210, and/or notification and action mapping 1215 prior to execution where fingerprinter 1205, analysis model 1210, and/or notification and action mapping 1215 are executed on-device.

Figure 15:
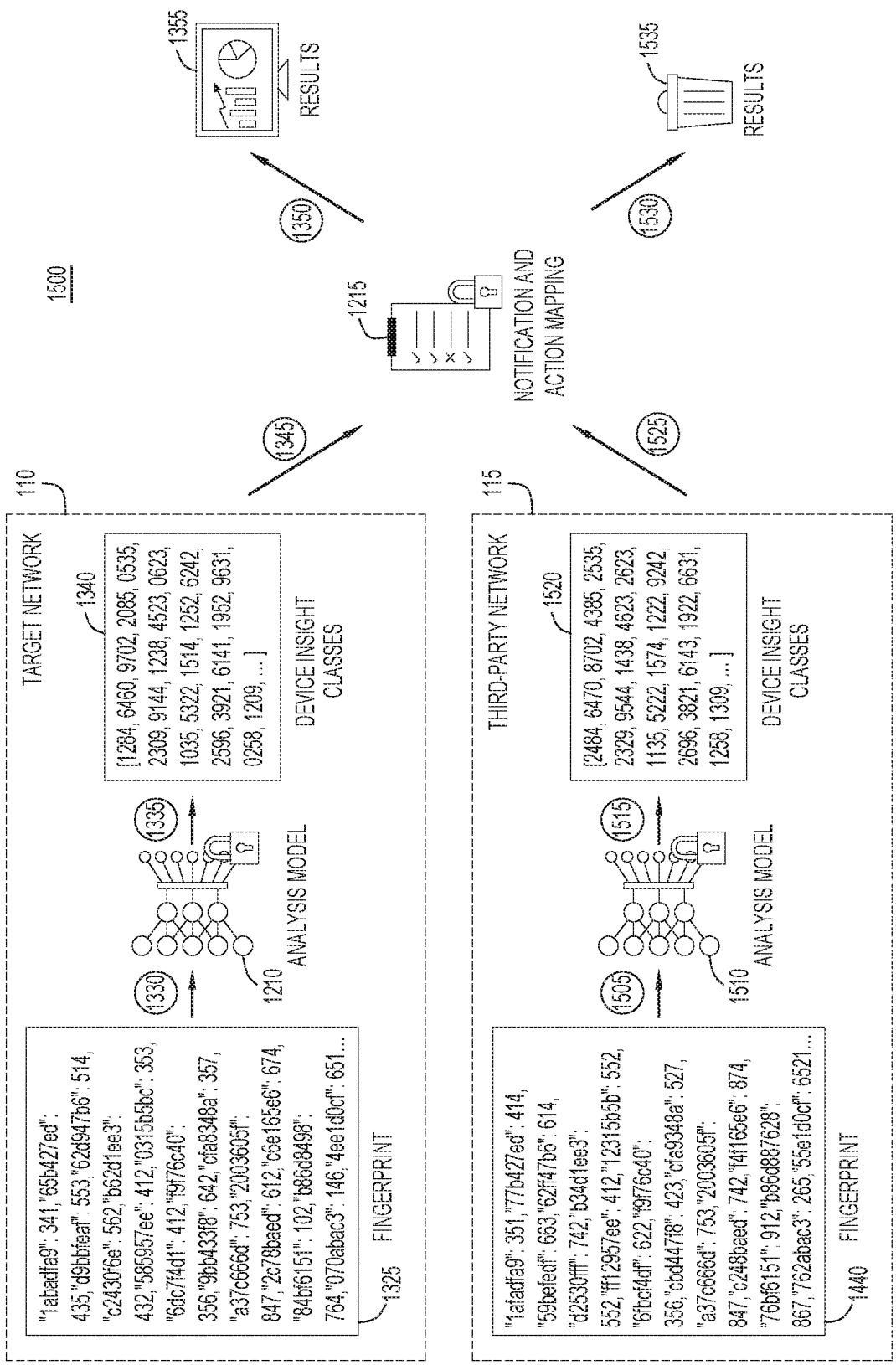
FIG. 15 illustrates a workflow for execution of a uniquely compatible fingerprinting process, analysis model, and notification and action mapping, and execution of a fingerprinting process and analysis model that is incompatible with the notification and action mapping, according to an example embodiment.

FIG. 15 illustrates an example workflow 1500 that demonstrates the uniquely compatible nature of analysis model 1210 and notification and action mapping 1215. In this example, a bad actor associated with third-party network 115 has stolen notification and action mapping 1215 from target network 110 and has deployed an identical copy in third-party network 115. At 1505, fingerprint 1440 is injected into analysis model 1510. Analysis model 1510 is uniquely compatible with fingerprinter 1420, which produced fingerprint 1440. Analysis model 1510 is run on fingerprint 1440 and, at 1515, generates device insight classes 1520. As shown, device insight classes 1340 are different from device insight classes 1520. This is because fingerprint 1325 differs from fingerprint 1440 and analysis model 1210 differs from analysis model 1510.

At 1525, notification and action mapping 1215 may obtain device insight classes 1520 and attempt to translate device insight classes 1520 into human-readable notification text and action recommendations. This may fail because device insight classes 1520 identifies classes that are not included in notification and action mapping 1215. At 1530, notification and action mapping 1215 may retrieve/output results 1535 indicating unintelligible or "garbage" results. Results 1535 are unintelligible even if fingerprinter 1420 ran on the same raw data as fingerprinter 1205.

Notification and action mapping 1215 cannot provide a meaningful output based on device insight classes 1520 because device insight classes 1520 include classes that are not included in notification and action mapping 1215. For example, device insight classes 1520 may include class "2484," which is not included in notification and action mapping 1215. Notification and action mapping 1215 is able to successfully analyze device insight classes 1340 because device insight classes 1340 includes classes that are also included in notification and action mapping 1215. By contrast, notification and action mapping 1215 cannot successfully process device insight classes 1520 because device insight classes 1520 includes classes (e.g., class "2484") that are not included in notification and action mapping 1215. Device insight classes 1340 may only be properly interpreted by notification and action mapping 1215, and device insight classes 1520 may only be properly interpreted by its peer notification and action mapping.

This example demonstrates how the unique compatibility (pairwise relationship) of analysis model 1210 and notification and action mapping 1215 protects against theft and unauthorized use of notification and action mapping 1215. In particular, including the same set of classes output by analysis model 1210 in notification and action mapping 1215 forms a unique class execution space to prevent the bad actor associated with third-party network 115 from stealing notification and action mapping 1215 (or analysis model 1210 or fingerprinter 1325) from target network 110 for detection of issues associated with network devices 140(1)-140(M). The bad actor thus cannot re-use notification and action mapping 1215 as a "black box," to obtain accurate results as an output. The bad actor is also prohibited from re-selling notification and action mapping 1215 for use in other networks and/or re-running notification and action mapping 1215 in any number of networks. Thus, packaging/joining fingerprinter 1205, analysis model training, analysis model 1210, and notification and action mapping 1215 as described herein may produce results only for a specific customer.

Figure 16:
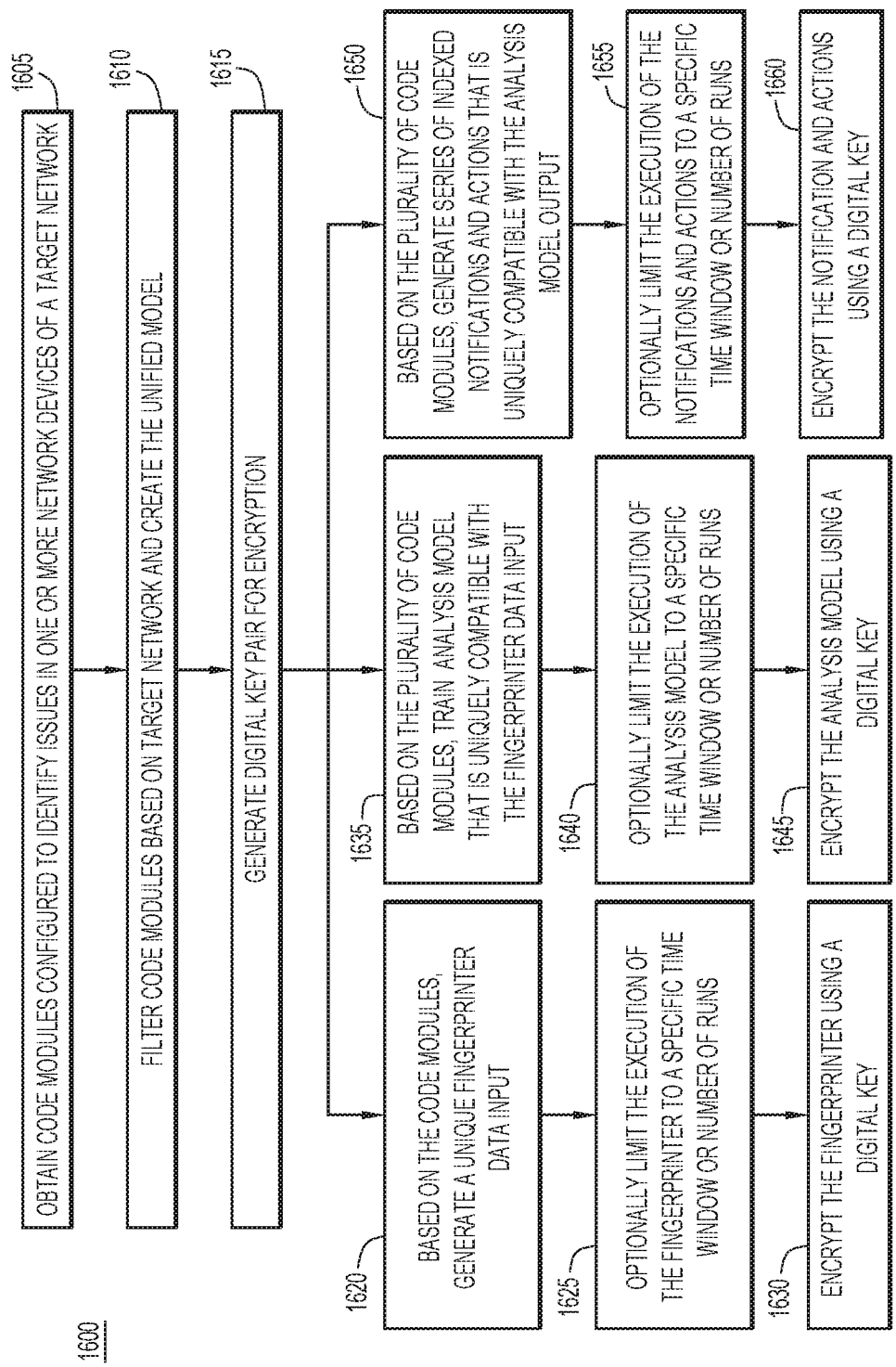
FIG. 16 illustrates a flowchart of a method for generating a uniquely compatible fingerprinting process, analysis model, and notification and action mapping, according to an example embodiment.

FIG. 16 illustrates an example flowchart of a method 1600 for generating a uniquely compatible fingerprinting process, analysis model, and notification and action mapping. In this example, fingerprinting process and analysis model generation server 120 performs method 1600. At 1605, fingerprinting process and analysis model generation server 120 obtains code modules configured to identify issues in one or more network devices of a target network. At 1610, fingerprinting process and analysis model generation server 120 filters the code modules based on the target network and creates a unified model. At 1615, fingerprinting process and analysis model generation server 120 generates a digital key pair for encryption.

Operations 1620, 1625, and 1630 relate to generation of a fingerprinter. At 1620, fingerprinting process and analysis model generation server 120 generates a unique fingerprinter data input based on the code modules. The fingerprinter may produce a fingerprint that includes a plurality of key-value pairs. Each key of the plurality of key-value pairs is a unique key that corresponds to select data associated with raw data obtained from the one or more network devices, and each value of the plurality of key-value pairs represents information regarding the select data. At 1625, fingerprinting process and analysis model generation server 120 optionally limits the execution of the fingerprinter to a specific time window or number of runs. At 1630, fingerprinting process and analysis model generation server 120 encrypts the fingerprinter using a digital key (e.g., a digital key generated at 1615).

Operations 1635, 1640, and 1645 relate to generation of an analysis model. At 1635, fingerprinting process and analysis model generation server 120 trains an analysis model that is uniquely compatible with the fingerprinter data input. The analysis model may be configured to identify the issues (or insights) in the one or more network devices based on the key-value pairs. At 1640, fingerprinting process and analysis model generation server 120 optionally limits the execution of the fingerprinter to a specific time window or number of runs. At 1645, fingerprinting process and analysis model generation server 120 encrypts the analysis model using a digital key (e.g., a digital key generated at 1615).

Operations 1650, 1655, and 1660 relate to generation of a notification and action mapping. At 1650, fingerprinting process and analysis model generation server 120 generates a series of indexed notifications and actions that is uniquely compatible with the analysis model output. This maps the analysis model output to the alert text which explains the insights found by the analysis model, and to actions that can be taken to resolve the problem(s). At 1655, fingerprinting process and analysis model generation server 120 optionally limits the execution of the notifications and actions to a specific time window or number of runs. At 1660, fingerprinting process and analysis model generation server 120 encrypts the analysis model using a digital key (e.g., a digital key generated at 1615).

Figure 17:
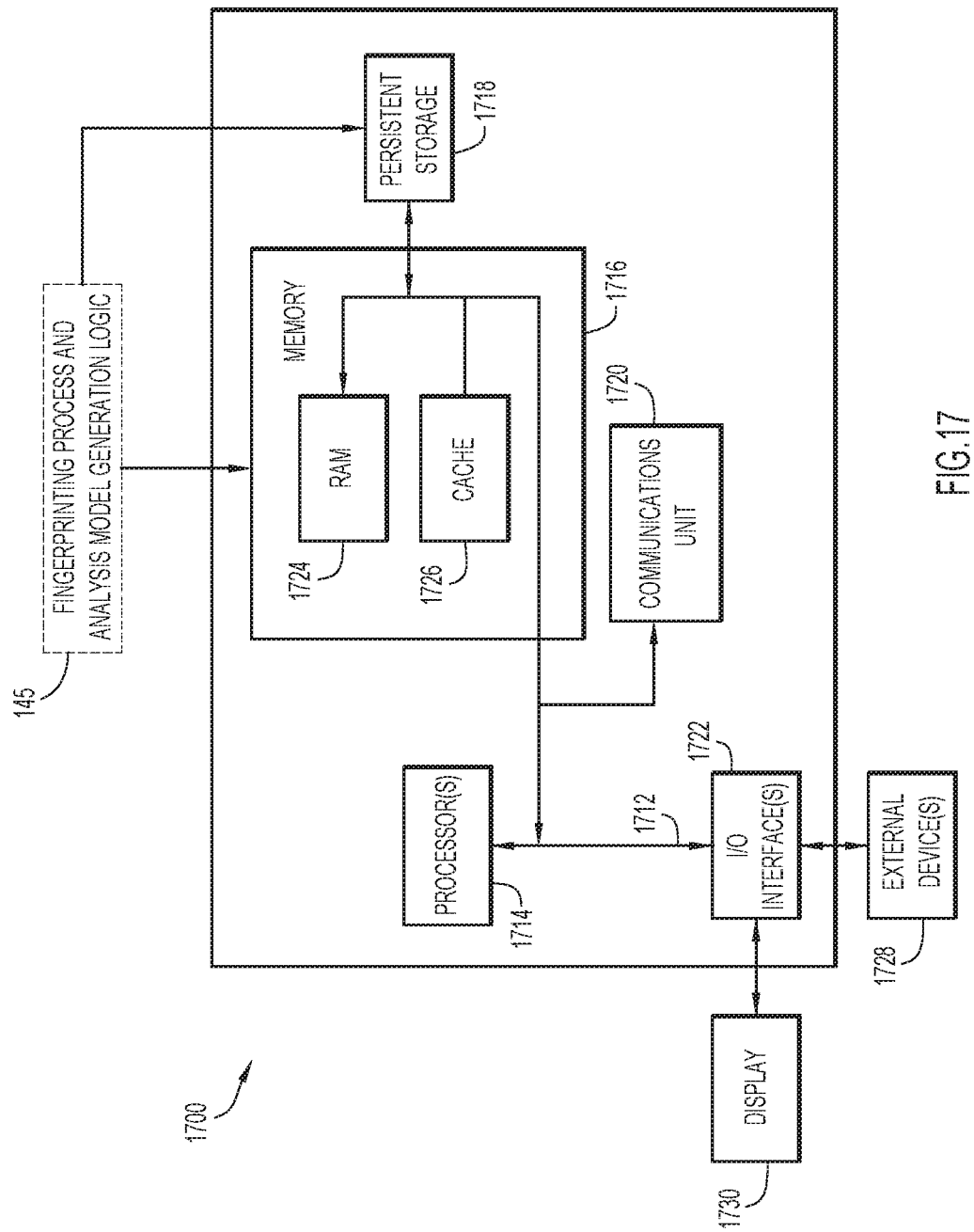
FIG. 17 illustrates a block diagram of a computing device configured to generate a uniquely compatible fingerprinting process and analysis model, according to an example embodiment.

FIG. 17 illustrates a hardware block diagram of an example device 1700, such as fingerprinting process and analysis model generation server 120 (FIG. 1). It should be appreciated that FIG. 17 provides only an illustration of one embodiment and does not imply any limitations with regard to the environments in which different embodiments may be implemented. Many modifications to the depicted environment may be made.

As depicted, the device 1700 includes a bus 1712, which provides communications between computer processor(s) 1714, memory 1716, persistent storage 1718, communications unit 1720, and Input/Output (I/O) interface(s) 1722. Bus 1712 can be implemented with any architecture designed for passing data and/or control information between processors (such as microprocessors, communications and network processors, etc.), system memory, peripheral devices, and any other hardware components within a system. For example, bus 1712 can be implemented with one or more buses.

Memory 1716 and persistent storage 1718 are computer readable storage media. In the depicted embodiment, memory 1716 includes Random Access Memory (RAM) 1724 and cache memory 1726. In general, memory 1716 can include any suitable volatile or non-volatile computer readable storage media. Instructions for fingerprinting process and analysis model generation logic 145 may be stored in memory 1716 or persistent storage 1718 for execution by computer processor(s) 1714.

One or more programs may be stored in persistent storage 1718 for execution by one or more of the respective computer processors 1714 via one or more memories of memory 1716. The persistent storage 1718 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 1718 may also be removable. For example, a removable hard drive may be used for persistent storage 1718. Other examples include optical and magnetic disks, thumb drives, and smart cards that are inserted into a drive for transfer onto another computer readable storage medium that is also part of persistent storage 1718.

Communications unit 1720, in these examples, provides for communications with other data processing systems or devices. In these examples, communications unit 1720 includes one or more network interface cards. Communications unit 1720 may provide communications through the use of either or both physical and wireless communications links.

I/O interface(s) 1722 allows for input and output of data with other devices that may be connected to device 1700. For example, I/O interface(s) 1722 may provide a connection to external devices 1728 such as a keyboard, keypad, a touch screen, and/or some other suitable input device. External devices 1728 can also include portable computer readable storage media such as database systems, thumb drives, portable optical or magnetic disks, and memory cards.

Software and data used to practice embodiments can be stored on such portable computer readable storage media and can be loaded onto persistent storage 1718 via I/O interface(s) 1722. I/O interface(s) 1722 may also connect to a display 1730. Display 1730 provides a mechanism to display data to a user and may be, for example, a computer monitor.

Figure 18:
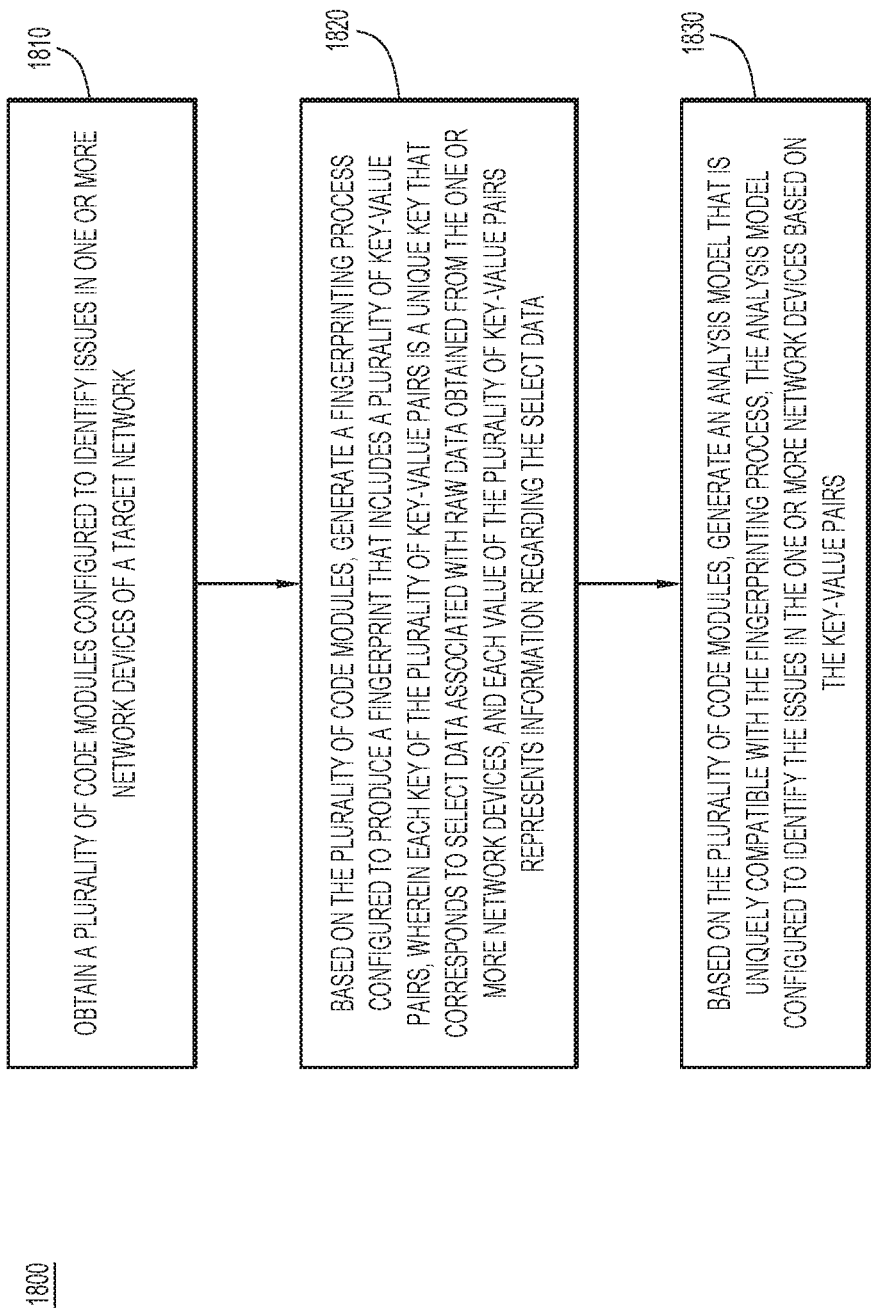
FIG. 18 illustrates a flowchart of a method for generating a uniquely compatible fingerprinting process and analysis model, according to an example embodiment.

FIG. 18 is a flowchart of an example method 1800 for generating a uniquely compatible fingerprinting process and analysis model. In this example, fingerprinting process and analysis model generation server 120 performs method 1800. At 1810, fingerprinting process and analysis model generation server 120 obtains a plurality of code modules configured to identify issues in one or more network devices of a target network. At 1820, based on the plurality of code modules, fingerprinting process and analysis model generation server 120 generates a fingerprinting process configured to produce a fingerprint that includes a plurality of key-value pairs. Each key of the plurality of key-value pairs is a unique key that corresponds to select data associated with raw data obtained from the one or more network devices. Each value of the plurality of key-value pairs represents information regarding the select data. At 1830, based further on the plurality of code modules, fingerprinting process and analysis model generation server 120 generates an analysis model that is uniquely compatible with the fingerprinting process. The analysis model is configured to identify the issues in the one or more network devices based on the key-value pairs.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a plurality of code modules configured to identify issues in one or more network devices of a target network; based on the plurality of code modules, generating a fingerprinting process configured to produce a fingerprint that includes a plurality of key-value pairs, wherein each key of the plurality of key-value pairs is a unique key that corresponds to select data associated with raw data obtained from the one or more network devices, and each value of the plurality of key-value pairs represents information regarding the select data; and based on the plurality of code modules, generating an analysis model that is uniquely compatible with the fingerprinting process, the analysis model configured to identify the issues in the one or more network devices based on the key-value pairs.

In one example, at least one value of the plurality of key-value pairs indicates a presence or an absence of the select data. In another example, at least one value of the plurality of key-value pairs indicates a numerical value associated with the select data.

In one example, obtaining the plurality of code modules includes obtaining a plurality of code modules specific to the target network.

In one example, the method further comprises setting a time window during which the fingerprinting process or the analysis model can be executed. In another example, the method further comprises limiting a number of possible runs of the fingerprinting process or the analysis model.

In one example, the method further comprises encrypting software product that is used to execute the fingerprinting process or the analysis model.

In one example, the analysis model is a machine learning model trained based on the keys of the plurality of key-value pairs.

In one example, the method further comprises generating a representation of each of the plurality of code modules in a common format, wherein generating the fingerprinting process and the analysis model includes generating the fingerprinting process and the analysis model based on the common format.

In one example, the method further comprises identifying, by the analysis model, the issues in the one or more network devices based on the fingerprinting process.

In one example, the analysis model is further configured to produce respective identifiers corresponding to respective notifications or recommended actions, and the method further comprises: generating a mapping of the respective identifiers to the respective notifications or recommended actions, wherein the mapping is uniquely compatible with the analysis model and the fingerprinting process, the mapping configured to provide the respective notifications or recommended actions based on the respective identifiers.

In another form, an apparatus is provided. The apparatus comprises: a memory configured to store processor-executable instructions; and one or more processors coupled to the memory, wherein the one or more processors are configured to: obtain a plurality of code modules configured to identify issues in one or more network devices of a target network; based on the plurality of code modules, generate a fingerprinting process configured to produce a fingerprint that includes a plurality of key-value pairs, wherein each key of the plurality of key-value pairs is a unique key that corresponds to select data associated with raw data obtained from the one or more network devices, and each value of the plurality of key-value pairs represents information regarding the select data; and based on the plurality of code modules, generate an analysis model that is uniquely compatible with the fingerprinting process, the analysis model configured to identify the issues in the one or more network devices based on the key-value pairs.

In another form, one or more non-transitory computer readable storage media are provided. The non-transitory computer readable storage media are encoded with instructions that, when executed by a processor, cause the processor to: obtain a plurality of code modules configured to identify issues in one or more network devices of a target network; based on the plurality of code modules, generate a fingerprinting process configured to produce a fingerprint that includes a plurality of key-value pairs, wherein each key of the plurality of key-value pairs is a unique key that corresponds to select data associated with raw data obtained from the one or more network devices, and each value of the plurality of key-value pairs represents information regarding the select data; and based on the plurality of code modules, generate an analysis model that is uniquely compatible with the fingerprinting process, the analysis model configured to identify the issues in the one or more network devices based on the key-value pairs.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a service provider network:
obtaining a plurality of code modules configured to identify issues in one or more network devices of a target network, wherein obtaining the plurality of code modules includes obtaining one or more bespoke code modules that are specific to the target network;
generating a unified model including a representation of each of the plurality of code modules in a common format;
based on the representation of the plurality of code modules in the common format, generating a fingerprinting process configured to parse raw textual data related to configurations of the one or more network devices and operations performed by the one or more network devices to identify regular expressions in the raw textual data, and produce fingerprint data that includes a plurality of key-value pairs based on the regular expressions, wherein each key of the plurality of key-value pairs is a unique feature identifier that corresponds to a regular expression identifying select data extracted from the raw textual data related to an operational issue in the one or more network devices, and each value of the plurality of key-value pairs indicates a presence or an absence of the select data in the raw textual data;

based on the representation of the plurality of code modules in the common format, generating an analysis model that is uniquely compatible with the fingerprint data produced by the fingerprinting process by training the analysis model using unique feature identifiers of the plurality of key-value pairs, the analysis model configured to identify device insight classes corresponding to respective notifications indicating the presence of the issues in the one or more network devices or respective recommended actions for resolving the issues in the one or more network devices based on the plurality of key-value pairs; and providing a software product used to execute the fingerprinting process and the analysis model to the target network to enable issue detection to be performed on-premise within the target network without exposing the raw textual data of the one or more network devices to the service provider network.

2. The method of claim 1, wherein at least one value of the plurality of key-value pairs indicates a presence or an absence of issue statistics including one or more of specific log data, device health assessment data, or configuration commands.

3. The method of claim 1, wherein at least one value of the plurality of key-value pairs indicates a numerical value associated with product metadata including at least one of a software version of a respective code module or hardware information of a respective network device.

4. The method of claim 1, further comprising:
setting a time period during which the fingerprinting process or the analysis model can be executed at the target network using the plurality of key-value pairs.

5. The method of claim 1, further comprising:
limiting a number of possible runs of executing the fingerprinting process or the analysis model at the target network using the plurality of key-value pairs.

6. The method of claim 1, further comprising:
encrypting the software product that is used to execute the fingerprinting process or the analysis model.

7. The method of claim 1, wherein the analysis model is a machine learning model that is trained based on the unique feature identifiers of the plurality of key-value pairs corresponding to respective regular expressions in the raw textual data, and the device insight classes corresponding to the respective notifications or the respective recommended actions.

8. The method of claim 1, further comprising:
at the target network:
producing, by the fingerprinting process, the fingerprint data that includes the plurality of key-value pairs; and
identifying, by the analysis model, the device insight classes corresponding to the presence or the absence of the issues in the one or more network devices based on the fingerprint data produced by the fingerprinting process to detect the issues on-premise within the target network without exposing the raw textual data of the one or more network devices to the service provider network.

9. The method of claim 1, further comprising:
at the service provider network:
generating a mapping of the device insight classes to the respective notifications indicating the presence of the issues or the respective recommended actions for resolving the issues, wherein the mapping is uniquely compatible with the device insight classes of the analysis model, the mapping configured to provide the respective notifications indicating the presence of the issues in the one or more network devices or the respective recommended actions for resolving the issues in the one or more network devices based on the device insight classes identified by the analysis model; and
providing the mapping to the target network to further enable issue remediation to be performed on-premise within the target network without exposing the raw textual data of the one or more network devices to the service provider network.

10. The method of claim 9, further comprising:
at the target network:
determining, using the mapping, the respective notifications indicating the presence or the absence of the issues in the one or more network devices or the respective recommended actions for resolving the issues in the one or more network devices based on the device insight classes identified by the analysis model; and
outputting the respective notifications or the respective recommended actions to remediate the issues on-premise within the target network without exposing the raw textual data of the one or more network devices to the service provider network.

11. The method of claim 1, wherein the select data extracted from the raw textual data related to operational issues in the one or more network devices and identified by respective regular expressions includes one or more of: metadata generated by the one or more network devices, system log messages, device configuration commands, operational data describing health or status of a device feature, device feature specific outputs, debugging outputs, or combinations thereof that are associated with or used to detect the operational issues in the one or more network devices.

12. An apparatus comprising:
a memory configured to store processor-executable instructions; and
one or more processors of a service provider network, wherein the one or more processors are coupled to the memory and configured to:
obtain a plurality of code modules configured to identify issues in one or more network devices of a target network, wherein the plurality of code modules includes one or more bespoke code modules that are specific to the target network;
generate a unified model including a representation of each of the plurality of code modules in a common format;
based on the representation of the plurality of code modules in the common format, generate a fingerprinting process configured to parse raw textual data related to configurations of the one or more network devices and operations performed by the one or more network devices to identify regular expressions in the raw textual data, and produce fingerprint data that includes a plurality of key-value pairs based on the regular expressions, wherein each key of the plurality of key-value pairs is a unique feature identifier that corresponds to a regular expression identifying select data extracted from the raw textual data related to an operational issue in the one or more network devices, and each value of the plurality of key-value pairs indicates a presence or an absence of the select data in the raw textual data;

based on the representation of the plurality of code modules in the common format, generate an analysis model that is uniquely compatible with the fingerprint data produced by the fingerprinting process by training the analysis model using unique feature identifiers of the plurality of key-value pairs, the analysis model configured to identify device insight classes corresponding to respective notifications indicating the presence of the issues in the one or more network devices or respective recommended actions for resolving the issues in the one or more network devices based on the plurality of key-value pairs; and provide a software product used to execute the fingerprinting process and the analysis model to the target network to enable issue detection to be performed on-premise within the target network without exposing the raw textual data of the one or more network devices to the service provider network.

13. The apparatus of claim 12, wherein at least one value of the plurality of key-value pairs indicates a presence or an absence of issue statistics including one or more of specific log data, device health assessment data, or configuration commands.

14. The apparatus of claim 12, wherein at least one value of the plurality of key-value pairs indicates a numerical value associated with product metadata including at least one of a software version of a respective code module or hardware information of a respective network device.

15. The apparatus of claim 12, wherein the one or more processors are further configured to:
set a time period during which the fingerprinting process or the analysis model can be executed at the target network using the plurality of key-value pairs; or
limit a number of possible runs of executing the fingerprinting process or the analysis model at the target network using the plurality of key-value pairs.

16. One or more non-transitory computer readable storage media encoded with instructions that, when executed by a processor of a service provider network, cause the processor to:
obtain a plurality of code modules configured to identify issues in one or more network devices of a target network, wherein the plurality of code modules includes one or more bespoke code modules that are specific to the target network;

generate a unified model including a representation of each of the plurality of code modules in a common format;

based on the representation of the plurality of code modules in the common format, generate a fingerprinting process configured to parse raw textual data related to configurations of the one or more network devices and operations performed by the one or more network devices to identify regular expressions in the raw textual data, and produce fingerprint data that includes a plurality of key-value pairs based on the regular expressions, wherein each key of the plurality of key-value pairs is a unique feature identifier that corresponds to a regular expression identifying select data extracted from the raw textual data related to an operational issue in the one or more network devices, and each value of the plurality of key-value pairs indicates a presence or an absence of the select data in the raw textual data;

based on the representation of the plurality of code modules in the common format, generate an analysis model that is uniquely compatible with the fingerprint data produced by the fingerprinting process by training the analysis model using unique feature identifiers of the plurality of key-value pairs, the analysis model configured to identify device insight classes corresponding to respective notifications indicating the presence of the issues in the one or more network devices or respective recommended actions for resolving the issues in the one or more network devices based on the plurality of key-value pairs; and provide a software product used to execute the fingerprinting process and the analysis model to the target network to enable issue detection to be performed on-premise within the target network without exposing the raw textual data of the one or more network devices to the service provider network.

17. The one or more non-transitory computer readable storage media of claim 16, wherein at least one value of the plurality of key-value pairs indicates a presence or an absence of issue statistics including one or more of specific log data, device health assessment data, or configuration commands.

18. The one or more non-transitory computer readable storage media of claim 16, wherein at least one value of the plurality of key-value pairs indicates a numerical value associated with product metadata including at least one of a software version of a respective code module or hardware information of a respective network device.

* * * * *